United States Patent
Gundel et al.

(10) Patent No.: US 12,474,389 B2
(45) Date of Patent: Nov. 18, 2025

(54) LOCAL PARTIAL DISCHARGE MONITORING

(71) Applicants: 3M Innovative Properties Company, St. Paul, MN (US); Connected Intelligence Systems Ltd., Netanya (IL)

(72) Inventors: Douglas B. Gundel, Cedar Park, TX (US); Uri Bar-Ziv, Zichron Yaakov (IL); Eyal Doron, Caesarea (IL)

(73) Assignees: 3M Innovative Properties Company, St. Paul, MN (US); Connected Intelligence Systems Ltd., Netanya (IL)

( * ) Notice: Subject to any disclaimer, the term of this patent is extended or adjusted under 35 U.S.C. 154(b) by 245 days.

(21) Appl. No.: 17/757,629

(22) PCT Filed: Dec. 31, 2020

(86) PCT No.: PCT/US2020/067687
§ 371 (c)(1),
(2) Date: Jun. 17, 2022

(87) PCT Pub. No.: WO2021/138573
PCT Pub. Date: Jul. 8, 2021

(65) Prior Publication Data
US 2023/0020865 A1    Jan. 19, 2023

Related U.S. Application Data

(60) Provisional application No. 62/955,500, filed on Dec. 31, 2019.

(51) Int. Cl.
*G01R 31/12* (2020.01)
*G01R 15/16* (2006.01)
*G01R 19/25* (2006.01)
*G01R 31/08* (2020.01)

(52) U.S. Cl.
CPC ........ *G01R 31/1272* (2013.01); *G01R 15/16* (2013.01); *G01R 19/2513* (2013.01); *G01R 31/081* (2013.01); *G01R 31/085* (2013.01)

(58) Field of Classification Search
CPC ............... G01R 31/1272; G01R 15/16; G01R 19/2513; G01R 31/081; G01R 31/083; G01R 31/085
See application file for complete search history.

(56) References Cited

U.S. PATENT DOCUMENTS

| | | | |
|---|---|---|---|
| 3,128,658 | A | 4/1964 | Mitchell et al. |
| 4,301,399 | A | 11/1981 | Miller et al. |

(Continued)

FOREIGN PATENT DOCUMENTS

| | | |
|---|---|---|
| CH | 641278 A5 | 2/1984 |
| CN | 1161763 A | 10/1997 |

(Continued)

OTHER PUBLICATIONS

International Preliminary Report on Patentability from International Application No. PCT/US2020/067687 dated Jul. 14, 2022, 9 pp.
International Search Report and Written Opinion of International Application No. PCT/US2020/067687 dated Apr. 6, 2021, 17 pp.

(Continued)

*Primary Examiner* — Amy He
(74) *Attorney, Agent, or Firm* — Shumaker & Sieffert, P.A.

(57) ABSTRACT

A partial discharge (PD) detection system includes a node including a sensor configured to capacitively couple to a shield layer of a cable of an electric power line. The sensor is configured to collect, from the cable, sensor data indicative of an alternating-current (AC) electrical signal in the cable. The system further includes a high-pass filter configured to filter out low-frequency signals from the sensor data, (Continued)

and processing circuitry configured to detect, based on the filtered sensor data, a PD event at a location on the cable that is local to the sensor.

16 Claims, 25 Drawing Sheets

(56) References Cited

U.S. PATENT DOCUMENTS

| | | | |
|---|---|---|---|
| 4,321,643 A | 3/1982 | Vernier | |
| 4,345,362 A | 8/1982 | de Givry | |
| 4,424,480 A | 1/1984 | Stefan | |
| 4,745,828 A | 5/1988 | Stepan | |
| 4,802,512 A | 2/1989 | Kodera | |
| 5,038,457 A | 8/1991 | Yasushi et al. | |
| 5,243,882 A | 9/1993 | Stepan | |
| 5,272,439 A | 12/1993 | Mashikian et al. | |
| 5,272,941 A | 12/1993 | English et al. | |
| 5,323,117 A | 6/1994 | Endoh et al. | |
| 5,502,374 A | 3/1996 | Cota | |
| 5,617,859 A | 4/1997 | Souza et al. | |
| 5,756,972 A | 5/1998 | Vranicar et al. | |
| 5,892,430 A | 4/1999 | Wiesman et al. | |
| 5,936,725 A | 8/1999 | Pike et al. | |
| 6,286,393 B1 | 9/2001 | Messer et al. | |
| 6,617,859 B1 | 9/2003 | Orton | |
| 6,734,662 B1 | 5/2004 | Fenske | |
| 7,166,804 B2 | 1/2007 | Yumura et al. | |
| 7,285,961 B2 | 10/2007 | Shinmoto et al. | |
| 7,855,556 B2 | 12/2010 | Sasaki et al. | |
| 8,643,380 B1 | 2/2014 | Herbert | |
| 9,917,434 B2 | 3/2018 | George et al. | |
| 9,961,418 B2 | 5/2018 | Rodriguez et al. | |
| 10,192,678 B2 | 1/2019 | Koo et al. | |
| 10,338,103 B2 | 7/2019 | Gravermann et al. | |
| 10,571,510 B2 | 2/2020 | Di Stefano et al. | |
| 2005/0050713 A1 | 3/2005 | Locher et al. | |
| 2005/0099636 A1 | 5/2005 | Schweser | |
| 2007/0085548 A1* | 4/2007 | Shinmoto | G01R 31/1272 |
| | | | 324/508 |
| 2010/0114392 A1 | 5/2010 | Lancaster | |
| 2010/0308797 A1 | 12/2010 | Zimmermann | |
| 2010/0315092 A1 | 12/2010 | Nacson et al. | |
| 2012/0047724 A1 | 3/2012 | Yano et al. | |
| 2012/0192414 A1 | 8/2012 | Montena et al. | |
| 2012/0199392 A1 | 8/2012 | Samuelson et al. | |
| 2012/0203493 A1 | 8/2012 | Dobson et al. | |
| 2012/0268106 A1 | 10/2012 | Blake, Jr. et al. | |
| 2012/0306510 A1 | 12/2012 | White et al. | |
| 2013/0054162 A1 | 2/2013 | Smith et al. | |
| 2014/0125353 A1* | 5/2014 | Shu | G01R 15/16 |
| | | | 324/551 |
| 2014/0368215 A1 | 12/2014 | Hoffman et al. | |
| 2015/0062328 A1 | 3/2015 | Lauffer et al. | |
| 2015/0089815 A1 | 4/2015 | Woodward | |
| 2015/0120218 A1 | 4/2015 | Garnacho Vecino et al. | |
| 2015/0128399 A1 | 5/2015 | Meierhans et al. | |
| 2015/0287180 A1 | 10/2015 | Frey | |
| 2016/0054363 A1 | 2/2016 | Rostron et al. | |
| 2016/0091533 A1 | 3/2016 | Soleillant et al. | |
| 2016/0139181 A1 | 5/2016 | Gravermann et al. | |
| 2016/0225248 A1 | 8/2016 | Rodriguez, Jr. et al. | |
| 2017/0074920 A1* | 3/2017 | Di Stefano | G01R 31/16 |
| 2017/0222420 A1 | 8/2017 | Dhlamini | |
| 2017/0310092 A1 | 10/2017 | Viviroli | |
| 2017/0346265 A1 | 11/2017 | Soerensen | |
| 2018/0017611 A1 | 1/2018 | Radun et al. | |
| 2018/0059162 A1 | 3/2018 | LeBlanc et al. | |
| 2018/0062370 A1 | 3/2018 | Heidmann et al. | |
| 2018/0238955 A1 | 8/2018 | Bango et al. | |
| 2018/0252760 A1 | 9/2018 | Andle et al. | |
| 2018/0328531 A1 | 11/2018 | Weisenberg et al. | |
| 2019/0128927 A1 | 5/2019 | Shaw et al. | |
| 2019/0293706 A1 | 9/2019 | Sohn et al. | |

| | | | |
|---|---|---|---|
| 2019/0331942 A1* | 10/2019 | Eyal | G02F 1/125 |
| 2019/0369152 A1 | 12/2019 | Fallet et al. | |
| 2019/0393685 A1 | 12/2019 | Sedlacek | |

FOREIGN PATENT DOCUMENTS

| | | |
|---|---|---|
| CN | 1530965 A | 9/2004 |
| CN | 1601659 A | 3/2005 |
| CN | 1871523 A | 11/2006 |
| CN | 101666849 A | 3/2010 |
| CN | 102116824 A | 7/2011 |
| CN | 102313861 A | 1/2012 |
| CN | 102623871 A | 8/2012 |
| CN | 202373838 U | 8/2012 |
| CN | 202978201 U | 6/2013 |
| CN | 103339813 A | 10/2013 |
| CN | 103560441 A | 2/2014 |
| CN | 104407270 A | 3/2015 |
| CN | 104518393 A | 4/2015 |
| CN | 204256093 U | 4/2015 |
| CN | 104821521 A | 8/2015 |
| CN | 104849628 A | 8/2015 |
| CN | 104979740 A | 10/2015 |
| CN | 105043457 A | 11/2015 |
| CN | 204988364 U | 1/2016 |
| CN | 205175574 U | 4/2016 |
| CN | 205263241 U | 5/2016 |
| CN | 105629136 A | 6/2016 |
| CN | 105699860 A | 6/2016 |
| CN | 205509462 U | 8/2016 |
| CN | 106124948 A | 11/2016 |
| CN | 205719288 U | 11/2016 |
| CN | 106324459 A | 1/2017 |
| CN | 106353648 A | 1/2017 |
| CN | 106451253 A | 2/2017 |
| CN | 106461720 A | 2/2017 |
| CN | 206038828 U | 3/2017 |
| CN | 206135313 U | 4/2017 |
| CN | 106646156 A | 5/2017 |
| CN | 106771933 A | 5/2017 |
| CN | 206147041 U | 5/2017 |
| CN | 106855443 A | 6/2017 |
| CN | 106950477 A | 7/2017 |
| CN | 106980075 A | 7/2017 |
| CN | 107306021 A | 10/2017 |
| CN | 206685810 U | 11/2017 |
| CN | 107453188 A | 12/2017 |
| CN | 108169644 A | 6/2018 |
| CN | 108376884 A | 8/2018 |
| CN | 207765893 U | 8/2018 |
| DE | 2928727 A1 | 2/1981 |
| DE | 3025819 A1 | 2/1982 |
| DE | 3702735 A1 | 8/1988 |
| DE | 20117063 U1 | 1/2002 |
| DE | 202008017358 U1 | 8/2009 |
| DE | 102011079935 A1 | 1/2013 |
| EP | 1902498 A1 | 3/2008 |
| EP | 2472688 A2 | 7/2012 |
| EP | 2579055 A1 | 4/2013 |
| EP | 2806277 A1 | 11/2014 |
| EP | 2818881 A1 | 12/2014 |
| EP | 3002594 A1 | 4/2016 |
| EP | 3109958 A1 | 12/2016 |
| EP | 3182428 A1 | 6/2017 |
| FR | 2282179 A1 | 3/1976 |
| FR | 2920922 A1 | 3/2009 |
| GB | 2288696 A | 10/1995 |
| GB | 2463689 A | 3/2010 |
| JP | S60250068 A | 12/1985 |
| JP | H03273809 A | 12/1991 |
| JP | H06160459 A | 6/1994 |
| JP | H06308191 A | 11/1994 |
| JP | H09182237 A | 7/1997 |
| JP | H10201070 A | 7/1998 |
| JP | 2004156910 A | 6/2004 |
| JP | WO2009084433 A1 | 5/2011 |
| JP | 2015104274 A | 6/2015 |
| KR | 101317476 B1 | 10/2013 |
| KR | 101847456 B1 | 4/2018 |

(56) References Cited

FOREIGN PATENT DOCUMENTS

| WO | 9840756 | 9/1998 |
|----|---------|--------|
| WO | 0042444 | 7/2000 |
| WO | 2006100590 A1 | 9/2006 |
| WO | 2007052095 A1 | 5/2007 |
| WO | 2008072226 A2 | 6/2008 |
| WO | 2012130816 A1 | 10/2012 |
| WO | 2014129817 A1 | 8/2014 |
| WO | 2015179102 A1 | 11/2015 |
| WO | 2016019666 A1 | 2/2016 |
| WO | 2016058721 A1 | 4/2016 |
| WO | 2016088174 A1 | 6/2016 |
| WO | 2016088175 A1 | 6/2016 |
| WO | 2016137424 A1 | 9/2016 |
| WO | 2016177571 A2 | 10/2016 |
| WO | 2016187090 A1 | 11/2016 |

OTHER PUBLICATIONS

Van Der Wielen, "Synchronization of online PD detection and localization setups using pulse injection", Proceedings of the 7th International Conference on Properties and Applications of Dielectric Materials, vol. 1, IEEE, Jun. 2003, pp. 327-330.

Wang et al., "Calibration of capacitive couplers for online PD detection in HV cables", IEEE Electrical Insulation Magazine, vol. 11, No. 3, IEEE, May 2005, pp. 28-39.

Communication pursuant to Article 94(3) EPC from counterpart European Application No. 20848769.4 dated Aug. 2, 2024, 7 pp.

First Office Action and Search Report, and translation thereof, from counterpart Chinese Application No. 202080090682.3 dated Aug. 29, 2024, 30 pp.

Response to Communication pursuant to Article 94(3) EPC dated Aug. 2, 2024, from counterpart European Application No. 20848769.4 filed Dec. 2, 2024, 11 pp.

Second Office Action and Search Report, and translation thereof, from counterpart Chinese Application No. 202080090682.3 dated Feb. 25, 2025, 34 pp.

Decision of Rejection from counterpart Chinese Application No. 202080090682.3 dated Jul. 25, 2025, 21 pp. Only partial translation available.

\* cited by examiner

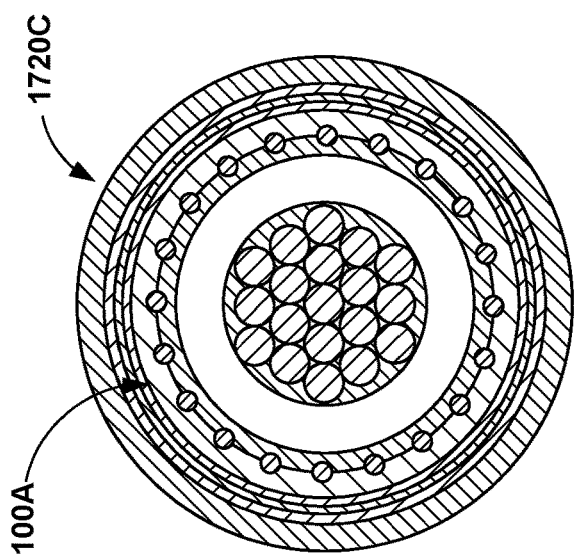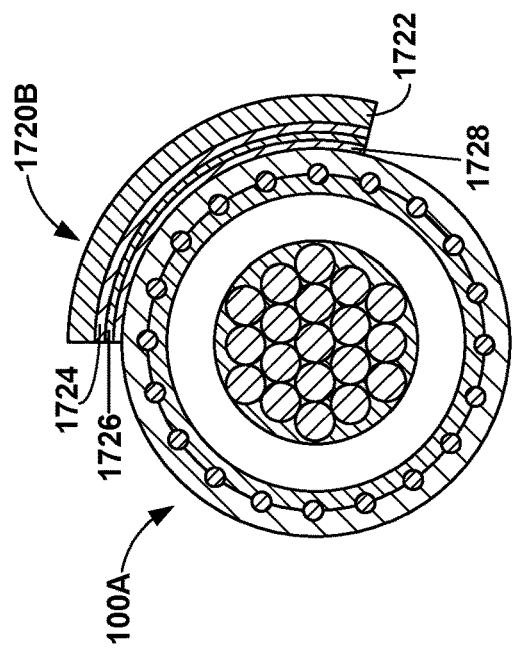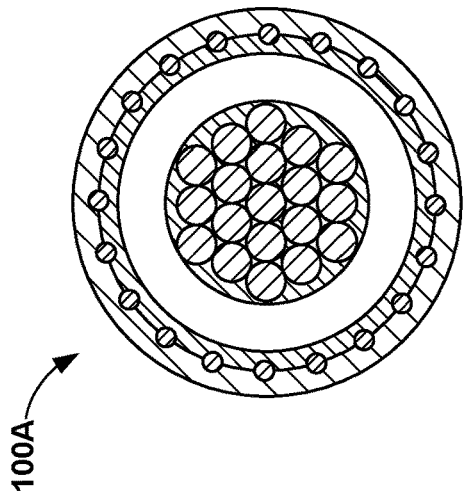

LOCAL PARTIAL DISCHARGE MONITORING

This application claims the benefit of U.S. Provisional Patent Application No. 62/955,500, entitled "ASSEMBLY, METHOD AND SYSTEM FOR SENSING, COMMUNICATING AND/OR CHARACTERIZING A CONDITION OF AN ELECTRICAL GRID FOR ON-LINE DIAGNOSTICS," and filed on Dec. 31, 2019, the entire contents of which are incorporated herein by reference.

TECHNICAL FIELD

The present disclosure relates to the field of electrical equipment, including power cables and accessories, for power utilities and industrial and commercial sites.

BACKGROUND

Electrical power grids include numerous components that operate in diverse locations and conditions, such as above ground, underground, cold weather climates, and/or hot weather climates. When a power grid suffers a failure, it can be difficult to determine the cause of the failure. Sensor systems for power networks, especially underground power networks, are increasingly becoming employed to detect grid anomalies (such as faults or precursors of faults) so that an operator can react more quickly, effectively, and safely to maintain service or return the system to service. Examples of sensor systems include faulted-circuit indicators, reverse-flow monitors, and power-quality monitors. Commonly assigned U.S. Pat. No. 9,961,418, incorporated by reference herein in its entirety, describes an underground power-network-monitoring system that communicates with a central system.

SUMMARY

In general, the present disclosure provides techniques for monitoring electrical equipment of a power grid and predicting the likelihood of failure events of the electrical equipment. The electrical equipment may include cable accessories, which may include a cable splice body or a cable termination body. In some examples, a power-line-monitoring system is configured to detect "local" (near-source) partial-discharge events.

In some examples herein, a power-line-monitoring system includes: a node having at least one sensor configured to capacitively couple to a shield layer of a cable of an electric power line, and further configured to collect, from the cable, sensor data indicative of an alternating-current (AC) electrical signal in the cable; a high-pass filter operatively coupled to the sensor and configured to filter out low-frequency signals from the sensor data; and processing circuitry operatively coupled to the high-pass filter and configured to detect, based on the filtered sensor data, a partial discharge (PD) event at a location on the cable that is local to the node.

In another example, a non-transitory, computer-readable medium includes instructions that, when executed by processing circuitry, cause the processing circuitry to detect, based on high-pass-filtered sensor data, a partial discharge (PD) event at a location on a cable of an electric power line, where the location is local to a node having at least one sensor capacitively coupled to a shield layer of the cable and configured to collect, from the cable, sensor data indicative of an alternating-current (AC) electrical signal in the cable.

In another example, a method includes detecting, based on high-pass-filtered sensor data, a partial discharge (PD) event at a location on a cable of an electric power line, wherein the location is within about ten meters of a node having a sensor that is capacitively coupled to a shield layer of the cable and that collected the sensor data; and injecting, via the node, an identifier into the cable in order to communicate, via the cable, the location of the PD event to a receiving node.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIGS. 17A-17C are conceptual diagrams illustrating cross-sectional views of power cables, illustrating an example capacitive coupling placement.

Figure 1:
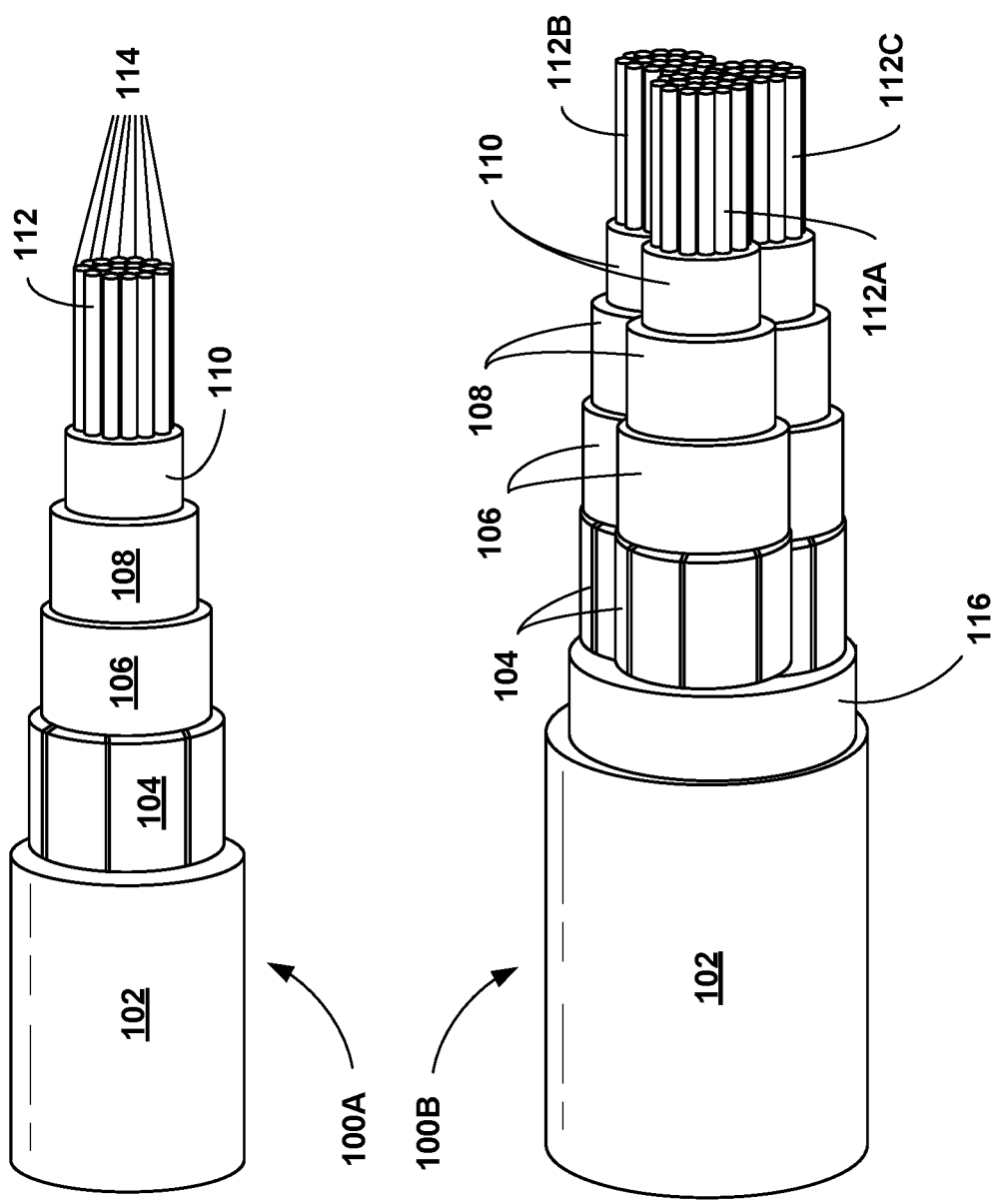
FIG. 1 is a schematic view of an example power cable construction.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Examples of the present disclosure include devices, techniques, and systems for sensing, communicating, and characterizing, a condition of an electrical grid via a power-line coupling. As such, the example devices described herein include multifunctional (sensing, communication, and characterization) devices. In this aspect, example devices may include a coupling layer that can provide a sensing layer that senses native signals and intentional (e.g., injected) signals. Moreover, the coupling layer may also provide for communication (e.g., signal injection, signal reception) and channel characterization.

Some example techniques herein include coupling a sensing-and-communicating system (e.g. a partial discharge (PD) detection system) onto a medium-voltage (MV) or high-voltage (HV) electrical-power-cable system. In some examples, a PD detection system may be retrofit onto an existing MV or HV cable system, rather than incorporating a PD detection system within a cable system at the time of manufacture of the cable system. In some such retrofit examples, the techniques of this disclosure include coupling the systems without compromising the integrity of the cables, e.g., by cutting the cables or penetrating a radial layer of the cables (e.g., a cable jacket). For instance, the example techniques herein include capacitively coupling a PD detection system to a cable shield of a power cable.

In an example construction, an electrical-power cable includes a plurality of concentric layers. In some examples, the plurality of concentric layers includes at least a first layer configured to concentrically surround a central conductor of the electrical cable and comprising an insulating material; a second layer comprising a conducting material (e.g., a cable shield layer): and a third layer comprising a resistive material (e.g., a cable jacket), wherein the second layer is disposed between the first layer and the third layer. In some examples, a conductor screen can be disposed radially between the central conductor and the insulation layer. In other examples, an insulation screen can be disposed between the shield layer and the insulation layer.

According to examples of this disclosure, a PD detection device can include a coupling layer, such as a metallic foil, to retrofit the device onto an electrical cable at virtually any suitable point, and can be utilized to monitor signals that exist on the shield layer. Some examples of such signals include "intentional" signals, such as incoming communication, or "unintentional" or "native" signals, such as PD. Other intentional signals can be characterizations of the cable that are sent from the same or other nodes.

The example devices and coupling-techniques described herein enable the devices to communicate information, such as PD information, faulted-circuit indicator (FCI) information, electrical-current information, temperature information, or other information. Each coupling layer can be connected to a signal wire that can convey the detected or injected signal to or from a source, detector, processor, or other device. In some embodiments, a protective cover or wrapping can also be utilized to cover or protect the coupling layer and/or signal wire connection.

In accordance with aspects of this disclosure, for distributed networks on an electrical-power grid, example devices are configured to interface with an electrical-power cable with little-to-no modification or other alteration of the power cable, thereby reducing the potential for cable damage. Example systems herein are configured to use these example devices and coupling techniques to communicate along the power line via a power-line-communication technique. In some examples, the devices may be retrofittable to an existing power line. Alternatively, the techniques herein may be applied to example devices that are coupled to (e.g., integrated) with a newly installed power line.

The multifunctional devices described herein can be integrated with various critical monitoring functionalities to support a grid operator in maintaining grid service or returning the grid to service when grid service is unavailable. For example, an FCI can include electrical-current sensing, hardware for processing FCI information, fault logic, communication, and power (e.g., potentially through power harvesting). These systems and devices can readily be packaged in a (secondary) retrofittable node that has communication only along the powerline (e.g., communication only to other nodes in the network). Other supported functionalities can include power-quality monitoring, PD monitoring, discrete-temperature monitoring, fault location, time-domain or frequency-domain reflectometry, incipient fault detection, and other functions. in some examples, these other functions also can be supported by a retrofittable coupling mechanism to reduce the cost per device and complexity of deployment. For enabling communication, in accordance with techniques of this disclosure, the retrofittable coupling system can support communication to a primary, centrally connected node from a secondary, satellite node, or from the satellite node to another secondary node.

Power lines may transmit electrical power from a power source (e.g., a power plant) to a power consumer, such as a business or home. Power lines may be underground, underwater, or suspended overhead (e.g., from wooden poles, metal structures, etc.). Power lines may be used for electrical-power transmission at relatively high voltages (e.g., compared to electrical cables utilized within a home, which may transmit electrical power between approximately 12 volts and approximately 240 volts depending on application and geographic region). For example, power lines may transmit electrical power above approximately 600 volts (e.g., between approximately 600 volts and approximately 1,000 volts). However, it should be understood that power lines may transmit electrical power over any voltage and/or frequency range. For example, power lines may transmit electrical power within different voltage ranges. In some examples, a first type of power line may transmit voltages of more than approximately 1,000 volts, such as for distributing power between a residential or small commercial customer and a power source (e.g., power utility). As another example, a second type of power line may transmit voltages between approximately 1 kV and approximately 69 kV, such as for distributing power to urban and rural communities. A third type of power line may transmit voltages greater than approximately 69 kV, such as for sub-transmission and transmission of bulk quantities of electric power and connection to very large consumers.

Power lines include electrical cables and one or more electrical cable accessories. For example, FIG. 1 depicts two example electrical-power cables 100A and 100B (collectively, "cables 100," or, in the alternative, "cable 100"). Power cable 100A is an example of a single-phase MV cable, e.g., having a single central conductor. Power cable 100A includes jacket or oversheath 102, metal sheath or cable shield 104, insulation screen 106, insulation 108, conductor screen 110, and central conductor 112. Power cable 100B is an example of a three-phase extruded medium-voltage (MV) cable, e.g., having three central conductors. Polyphase cables like cable 100B can carry more than one shielded-conductor 112A-112C within a single jacket 102. Other examples of typical, but not depicted, cable layers include swellable or water-blocking materials that are placed within the conductor strands 114 ("strand fill"), or between various other layers of the cable 100 ("filler 116").

Example cable accessories may include splices, separable connectors, terminations, and connectors, among others. In some examples, cable accessories may include cable splices configured to physically and conductively couple two or more cables 100. For example, a cable accessory can physically and conductively couple cable 100A to cable 100B. In some examples, terminations may be configured to physically and conductively couple a cable 100 to additional electrical equipment, such as a transformer, switch gear, power substation, business, home, or other structure.

In other examples, as detailed further below with respect to FIG. 2, a cable accessory can include a monitoring device 202A, 202B (collectively, "monitoring devices 202," or in the alternative, "monitoring device 202") having one or more sensors, one or more communication devices, and/or one or more power-harvesting devices, which may be electrically coupled to insulation screen 106 of the cable 100 to perform a variety of functions. The one or more sensors can output sensor data indicative of conditions of the cable accessory. Examples of such sensors include temperature sensors, partial discharge (PD) sensors, smoke sensors, gas sensors, and acoustic sensors, among others. The communication unit(s) may transmit sensed data to a remote computing system and/or apply local analytics on sensed data.

According to further aspects of this disclosure, a computing system, such as a. remote computing system and/or a computing device integrated within the monitoring device 202 of the cable accessory, determines a "health" of the cable accessory based at least in part on the coupling and/or other sensor data. For example, the computing system may, e.g., in real-time, determine whether the cable accessory 202 will fail within a predetermined amount of time based at least in part on the sensor data. By determining a health of the cable accessories and predicting failure events before they occur, a computing system may more-quickly and more-accurately identify potential failure events that may affect the distribution of power throughout the power grid, or worker and/or civilian safety, to name only a few examples. Further, the computing system may proactively and preemptively generate notifications and/or alter the operation of a power grid before a failure event occurs.

In examples of this disclosure, a retrofittable monitoring device 202 includes a coupling layer that can support the other functionalities that either inject or extract "intentional" signals or those that extract "unintentional" or "native" signals (e.g., partial discharge signals) that can be indicative of impending failure of the cable 100, Intentional signals that support the functionalities above include pulses or chirps that can help characterize the power line (e.g. time-domain retroreflectometry (TDR) or frequency-domain retroreflectometry (FDR)) or time-synchronization signals that synchronize timing between one location and another. Unintentional or native signals of interest on the power line include the AC waveform and anomalies embedded within the AC waveform, or partial discharges (PDs), for example. In addition, because both native and intentional signals are subject to noise interference, a coupling mechanism that eliminates at least some noise is beneficial.

In general, the example systems, devices, and/or techniques described herein can provide a retrofittable coupling mode for cable 100 that can support communication along cable 100 to other parts of a network; a coupling that can support various functionalities for infrastructure monitoring where intentional signals are injected and/or extracted and native signals are extracted; a coupling method that reduces noise; combinations of the retrofit cable communication capability with at least one function and noise reduction; and/or a coupling that supports more than one function.

The signals described herein, including both unintentional native signals (e.g. PD) and intentional signals (e.g. communication signals), may typically include radio-frequency (RF) signals, which lie in the frequency range of about 0.1 to about 10 MHz. Within this frequency range, cable 100 can be considered as a coaxial transmission line, that includes a central conductive core 112, a dielectric insulating layer 108, and a coaxial conducting shield 104 being grounded at one or both of the cable ends. In such a system, at a distance far enough from the ends, the electric potential on both the core conductor 112 and the shield 104 will oscillate relative to ground. Consequently, the signal may be detected by capacitively coupling to the shield 104, e.g., by wrapping a conducting layer 118 (e.g., a conductive metal foil 118 of FIG. 3) over the cable jacket 102, thereby creating a coupling capacitor 120 (FIG. 3) that includes the shield 104, the jacket dielectric 102, and the conducting layer 118.

One example technique for measuring the RF signals is to measure the potential difference between the coupling capacitor 120 and the local ground 420 (FIG. 4), for example by connecting an RF amplifier (e.g., node 402 of FIG. 4) between them. Another approach is to connect the coupling capacitor 120 to a grounded current amplifier and measure the current flowing through the capacitor 120. In the present description, such implementations are referred to as "single-ended."

It is noted that in a single-ended method, it is possible that any RF noise present on the local ground may be injected into the measurements. Additionally, the cables 100 may pick up noise along the way, e.g. by electromagnetic pickup. Finally, there may not be a convenient ground connection available at the installation point.

To address the above issues, the single-ended implementation may be replaced with a "differential" method. For example, FIG. 2 shows a first example where differential capacitive coupling is employed on three cables 100A-100C. As illustrated in FIG. 2, the techniques of this disclosure include differential coupling of a monitoring device (or "communication device") 202 to the cable shields 104 of a cable pair, or in some examples, to the cable shields 104 of at least two distinct cables 100, from which a particular pair of two cables may be subsequently selected by a user. More specifically, the communication device 202 may be physically coupled to the outer jackets 102 of cables 100, but capacitively coupled to the cable shields 104 located underneath the jackets 102. If three cables 100A-100C are available, then there are three potential cable pairs (100A, 100B), (100B, 100C), and (100A, 100C) that are available for coupling. In multi-cable cases having a number "n" of cables 100 wherein n>3, then there are n!/2 unique possible combinations of cable pairs that may be selected from among the n cables 100. The communication signal can be multiplexed or repeated on these multiple pairs. This signal can be extracted from a similarly coupled communication device located at a remote location. Each device 202 can sense locally and communicate information, or can act as a repeater to send the information along, or act as a concentrator to collect the information and then send the information to a central location.

Figure 2:
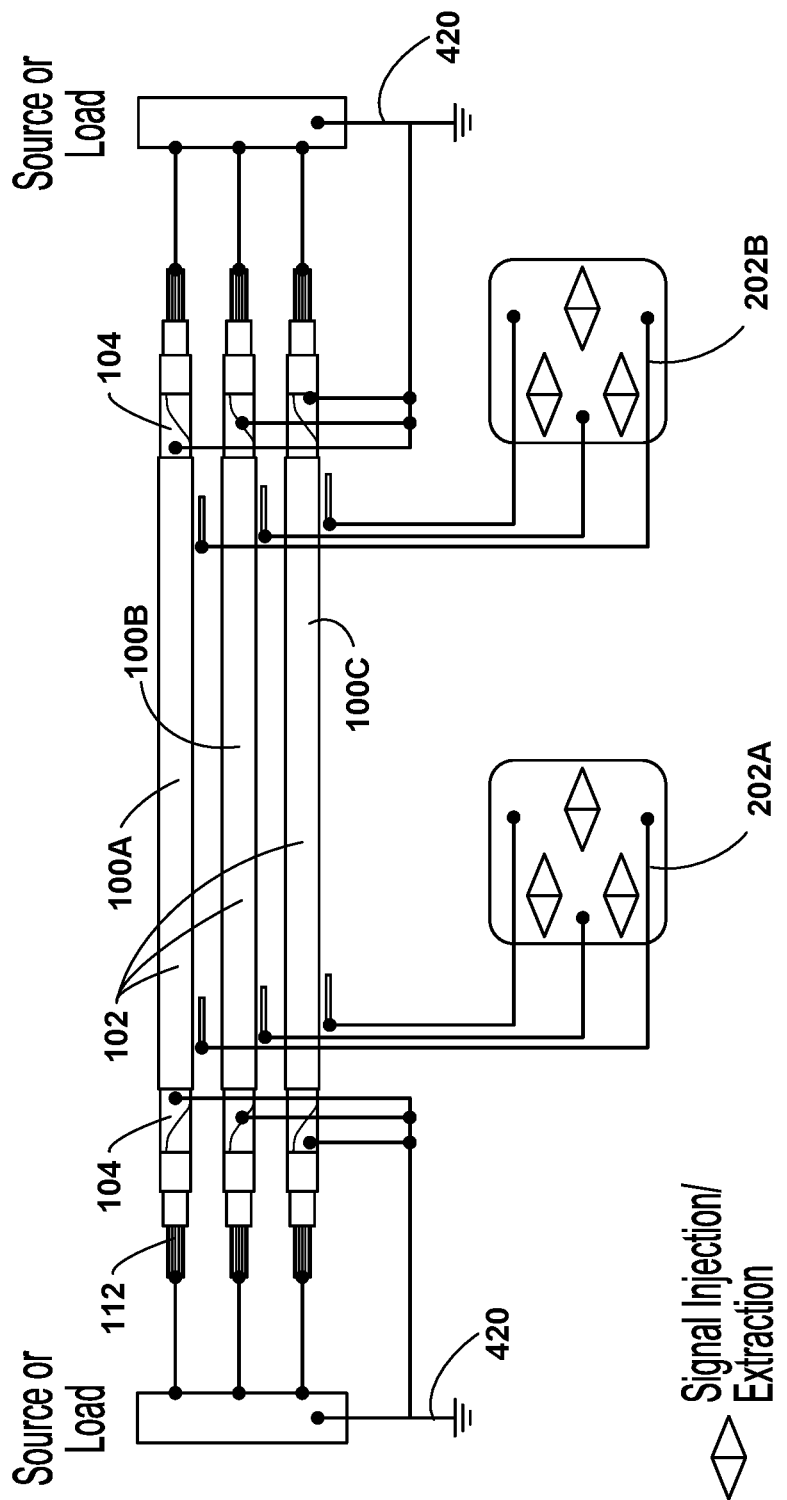
FIG. 2 is a schematic diagram of an example differential coupling system according to techniques of this disclosure.

As shown in FIG. 2, a device 202 may be capacitively coupled to at least two separate cables 100B, 100C associated with two different phases. These cables 100B, 100C can be of the same three-phase group or can be unrelated single phases. A voltage or current amplifier 310C (FIG. 3) may then be connected between the two coupling capacitors 120. thus measuring the potential difference or the current flowing between them. Such an implementation does not require an independent ground, and so entails a "floating" installation that can be easily coupled onto the cable system. Furthermore, a differential approach will be insensitive to any common-mode noise picked up by the system. For example, in a three-phase system (FIGS. 2 and 3), the three cables 100A-100C are laid as a bundle, and accordingly, the cables will pick up approximately the same electromagnetic noise, which a differential setup will then reduce or cancel out. Similarly, if the phases are not in the same three-phase system, the cables can also have similar pick-up.

Another feature of the capacitive coupling to the cable shield 104 is that this approach allows a straightforward approach to inject RF signals into the cable system, e.g., by applying an RF voltage between the coupling capacitor 120 and the ground 420, e.g., for a single-ended system, or differentially between cable pairs. The injected signals may be received similarly to the method used for native signals, as described above. The injection and pickup of such intentional signals may be used for various purposes, such as: communication between devices; time synchronization between devices; time-domain reflectometry (TDR) or frequency-domain reflectometry (FDR) to detect and localize defects, faults and structural changes in the cable system; channel characterization (e.g., frequency dependent loss, propagation delay); and grid configuration/mapping.

In addition, intentional signals may be injected into more than one channel, e.g. into two or more cables 100 or cable pairs. Such a multichannel approach allows an increased communication bandwidth and/or enhanced communication reliability, It is possible to use the same monitoring device (or "coupling device") 202 for more than one function; thus the same capacitive couplers 120 may be used, e.g., for both PD detection and communication. Also, the coupling device(s) 202 described here can be used by a single monitoring node within a network that has multiple nodes using similar or different coupling devices at the other multiple nodes.

Figure 3:
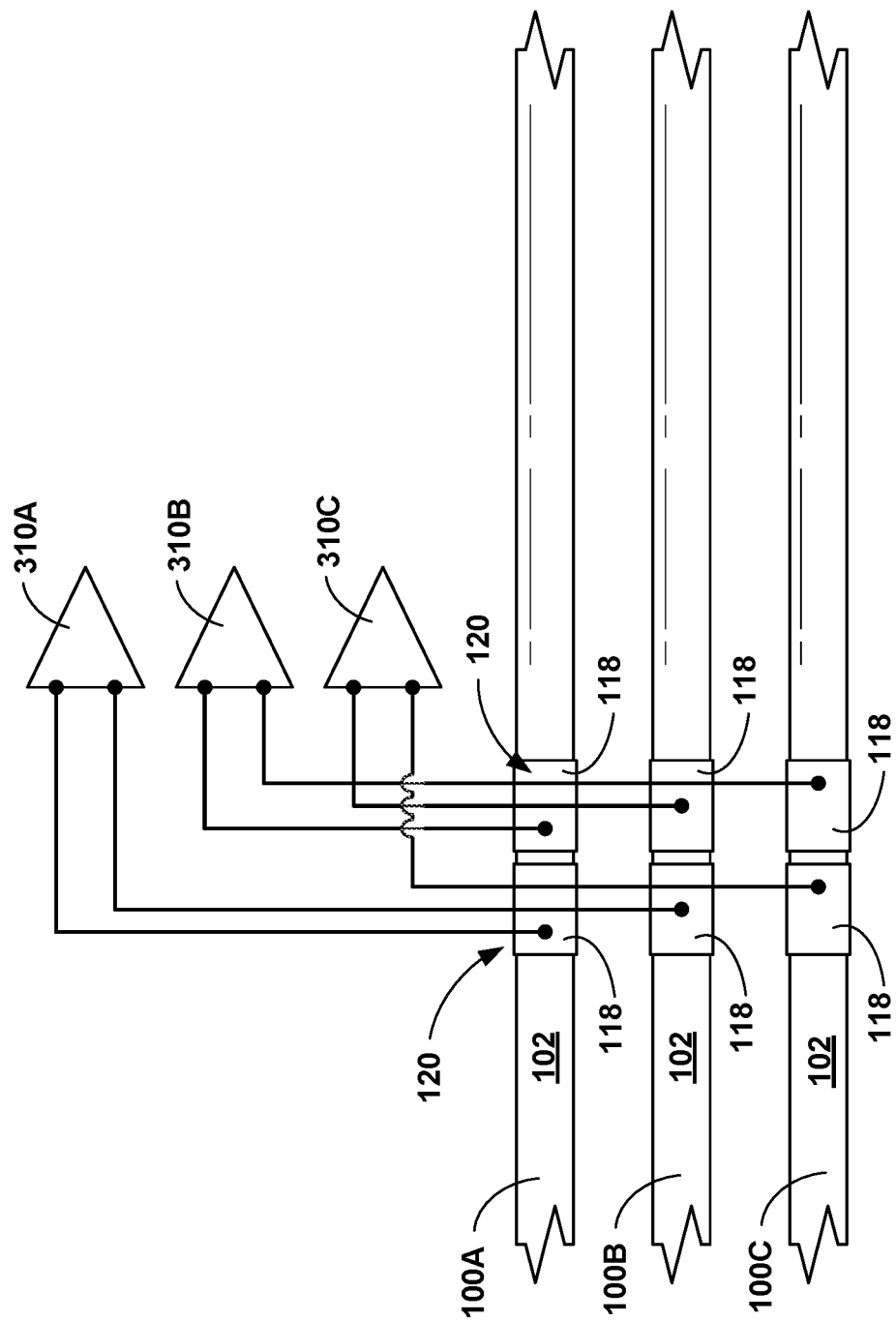
FIG. 3 is a schematic diagram of another example differential coupling implementation according to techniques of this disclosure.

FIG. 3 illustrates a specific coupling solution for the case of current amplifiers. As depicted in FIG. 3, current amplifiers 310A-310C (collectively "current amplifiers 310," or, in the alternative, "current amplifier 310") may be used for coupling, where two foil capacitors 120 on each cable 100 are capacitively coupled to the shields 104 (FIG. 2) via physical coupling to the conducting layer 118 on outer jackets 102. Such examples require separate pairs of capacitors 120 per differential channel, thus preventing unwanted signal leakage between the channels. An alternative is to use one capacitor 120 (e.g., conductive foil 118) for each power cable 100 with a high-impedance voltage amplifier rather than a low-impedance current amplifier 310 where multiple amplifiers 310 can connect to each foil capacitor 120. This single-capacitor-per-cable example is depicted in other figures throughout this disclosure, but it is to be understood that the double-capacitor-per-cable example depicted in FIG. 3 is available an additional or alternative example to any of the single-capacitor examples described herein.

Figure 4:
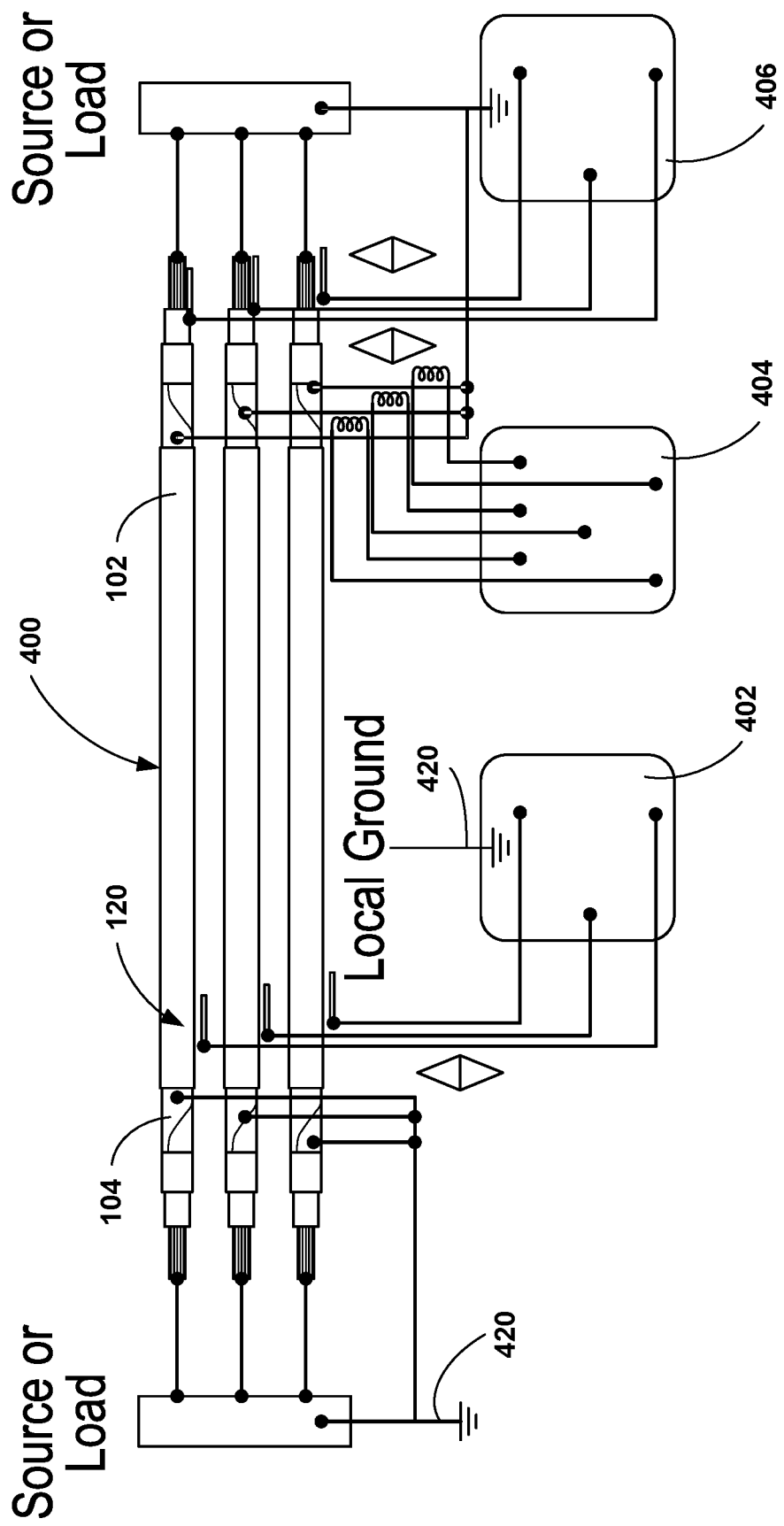
FIG. 4 is a schematic diagram of another example differential coupling system according to techniques of this disclosure.

FIG. 4 is a schematic diagram of another example differential coupling system according to techniques of this disclosure. Whereas FIG. 3 depicted a specific example of differential coupling and cable-shield-104 capacitive coupling, FIG. 4 depicts a more general example of differential or single-ended capacitive coupling to cable shields 104, and also other coupling on the same line or lines to extract or inject other signals of interest (e.g., a communication signal). This other coupling can be single-ended (ground reference) or differential (reference to another voltage).

For instance, FIG. 4 depicts three example cable-monitoring devices 402, 404, and 406. Cable-monitoring device 402 is capacitively coupled to cable shield 104, via a physical coupling overtop of cable jacket 102 (or a cable splice, if present). Cable-monitoring device 402 is an example of a differential or single-ended functional device.

Cable-monitoring device 404 is inductively coupled to cable shield 104, via a physical connection to a wired connection to a local ground 420. Cable-monitoring device 404 is an example of a device that is differential between phases, or a "differential-one-phase-each (DOPE)" functional device.

Cable-monitoring device 406 is capacitively coupled directly to central conductor 112, or adjacent to central conductor 112. Cable-monitoring device 406 is an example of a single-ended functional device.

Figure 5:
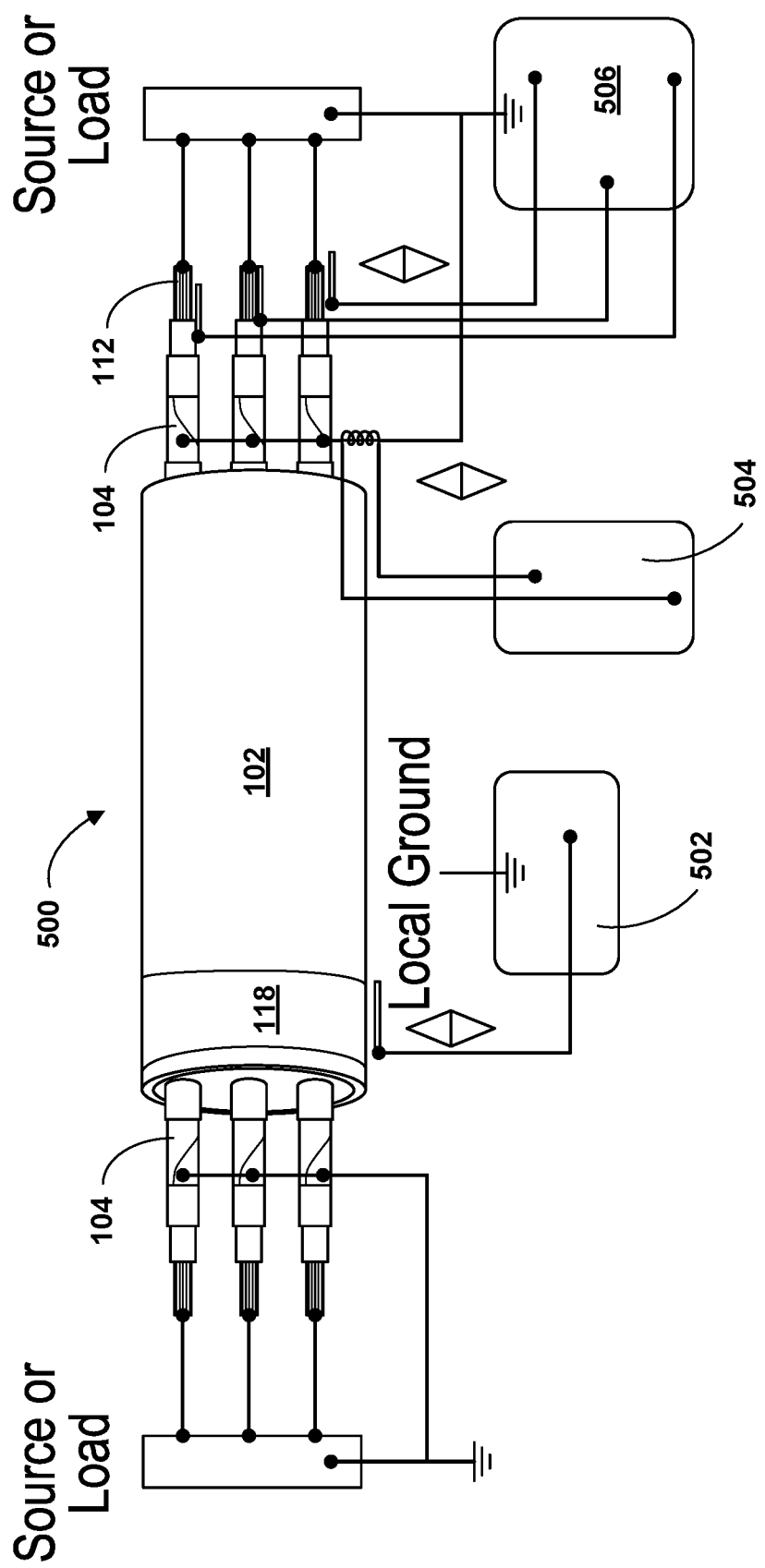
FIG. 5 is a schematic diagram of an example differential coupling implementation on a multiphase cable according to techniques of this disclosure.

FIG. 5 is a schematic diagram of example differential coupling implementations on a multiphase cable 500, according to techniques of this disclosure. As shown in FIG. 5, capacitive coupling can also be employed on a multiphase cable 500 with the ability to also communicate to other devices with other or similar coupling means. FIG. 5 includes a first example cable-monitoring device 502, such as a single-ended functional device, that is capacitively coupled to cable shields 104 via a physical coupling overtop of cable jacket 102 and conductive foil 118, as described above. FIG. 5 further depicts a second example cable-monitoring device 504, such as a differential functional device, that is inductively coupled to cable shields 104. FIG. 5 further depicts a third example cable-monitoring device 506, such as a differential or single-ended functional device, that is capacitively coupled to central conductors 112 of cable 500.

Figure 6:
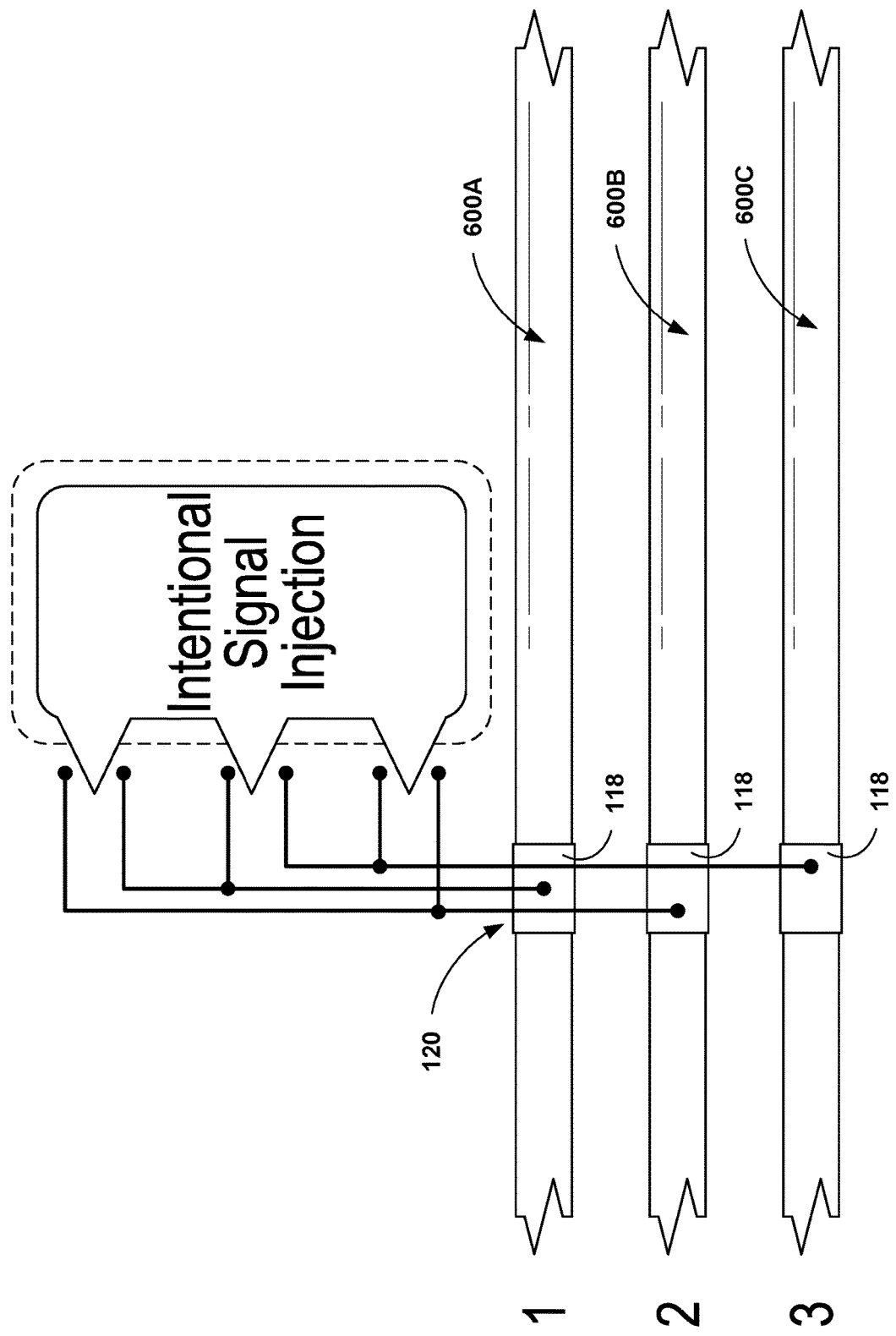
FIG. 6 is a schematic view illustrating intentional signal injection into differential couplers according to techniques of this disclosure.

FIG. 6 is a schematic view illustrating intentional signal injection into differential capacitive couplers 120 of cables 600A-600C, according to techniques of this disclosure. Intentional signals, in addition to communication signals, can be injected into the differential couplers 120. Examples of intentional signals include channel characterization, time domain reflectometry (TDR), fault location, time synchronization, frequency domain reflectometry (FDR), structural-anomaly detection, and other applications. Portions of these intentional signals can be spread across various frequencies and also physically distributed across the 1, 2, 3, or more channels, or can be repeated across the 1, 2, 3 or more channels.

Figure 7:
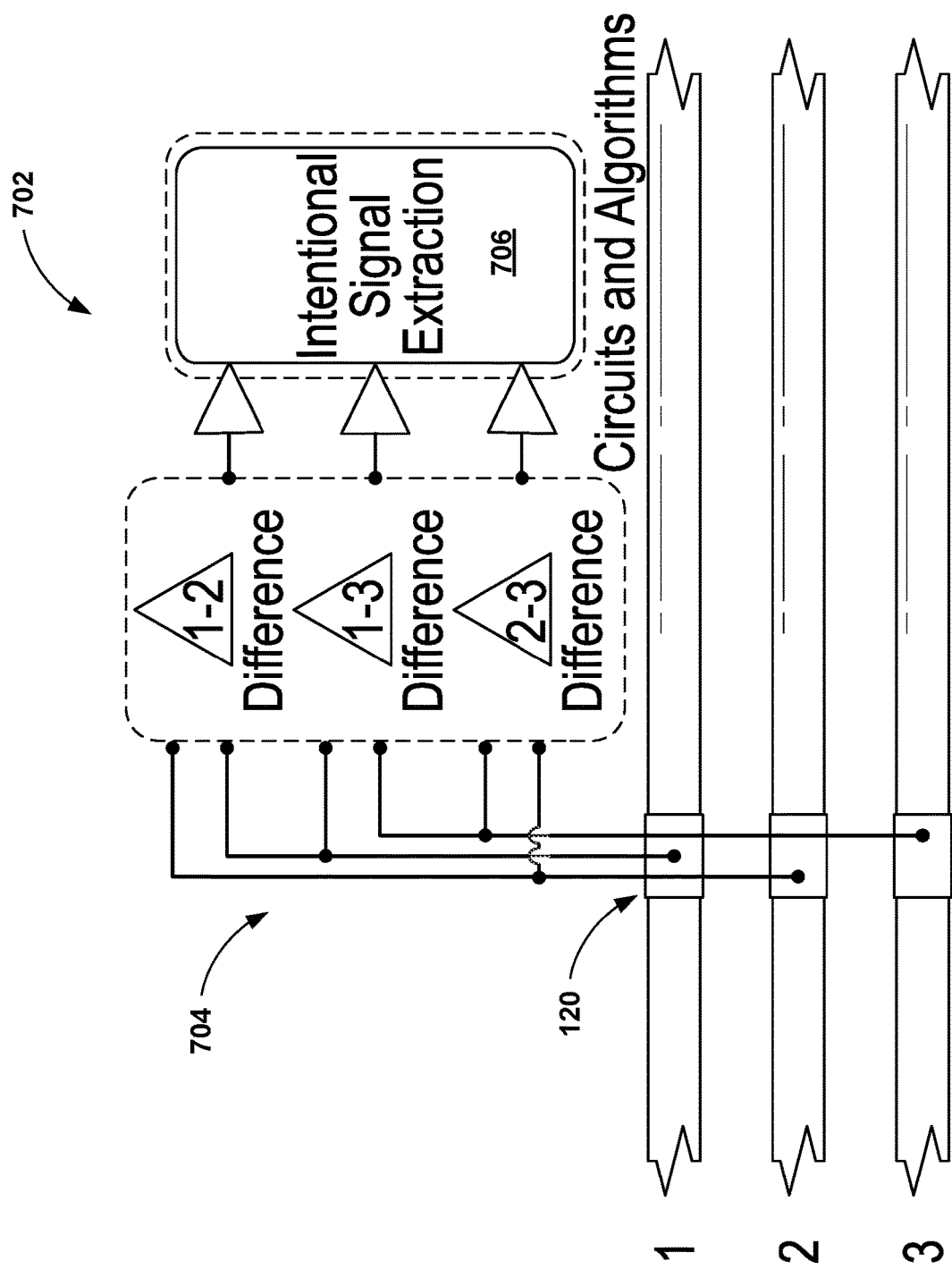
FIG. 7 is a schematic view illustrating intentional signal extraction according to techniques of this disclosure.

FIG. 7 is a schematic view illustrating intentional-signal extraction, according to techniques of this disclosure. For example, FIG. 7 depicts an example cable-monitoring device 702 (e.g., node 202A of FIG. 2) configured to extract the intentional signals through the difference coupling 704 (e.g., the capacitive coupling 120 across any cable pair). The difference coupling 704 has the added advantage of eliminating common-mode noise. Cable-monitoring device 702 includes a differential coupling 704 across every potential cable pair (e.g., cables 1 and 2, cables 2 and 3, and cables 1 and 3). Device 702 further includes corresponding circuitry 706 (configured to execute suitable algorithms) to extract the intentional signals by comparing the differential signals from each cable pair.

Figure 8:
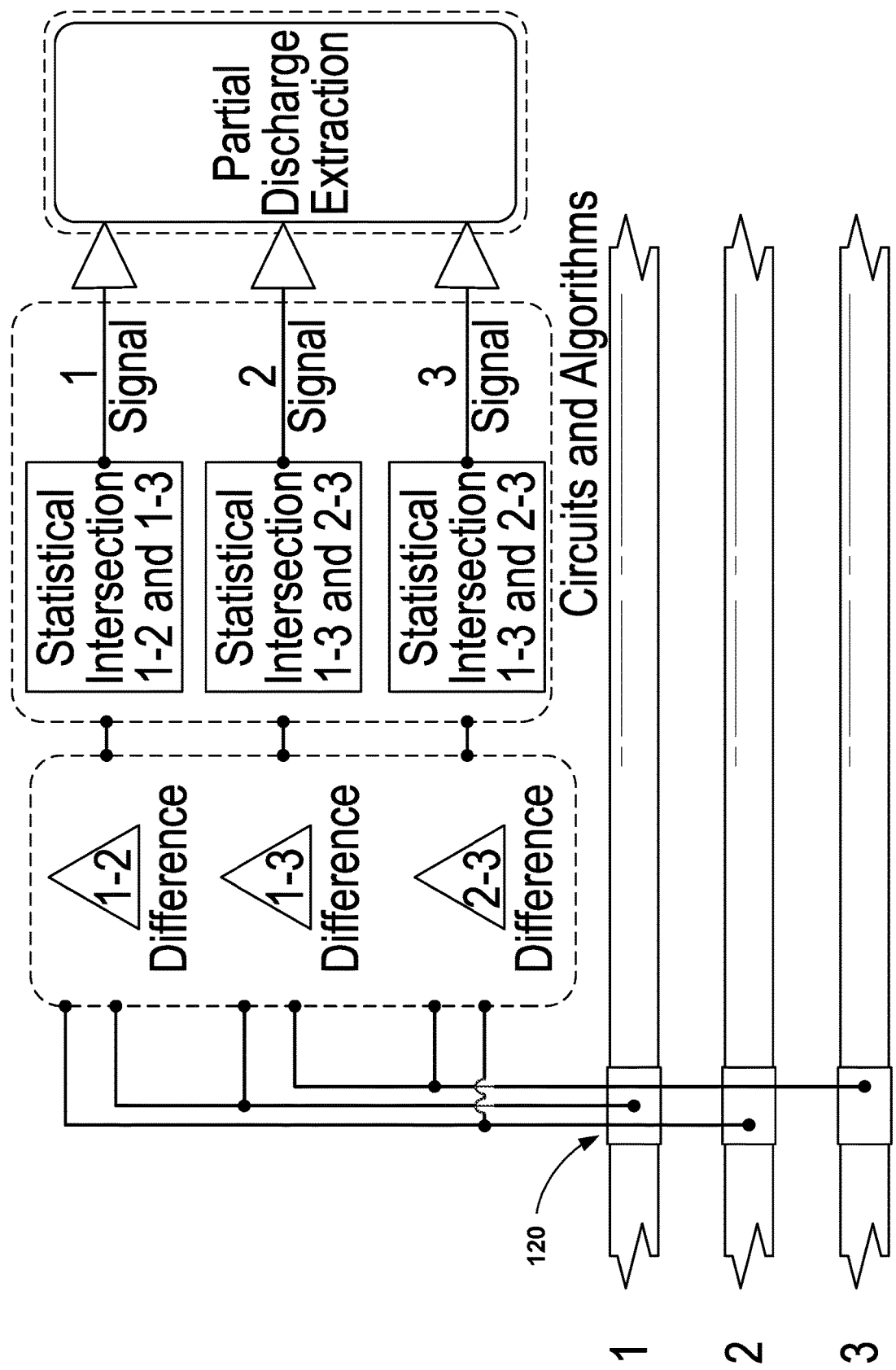
FIG. 8 is a schematic view illustrating partial discharge extraction according to techniques of this disclosure.
Figure 9:
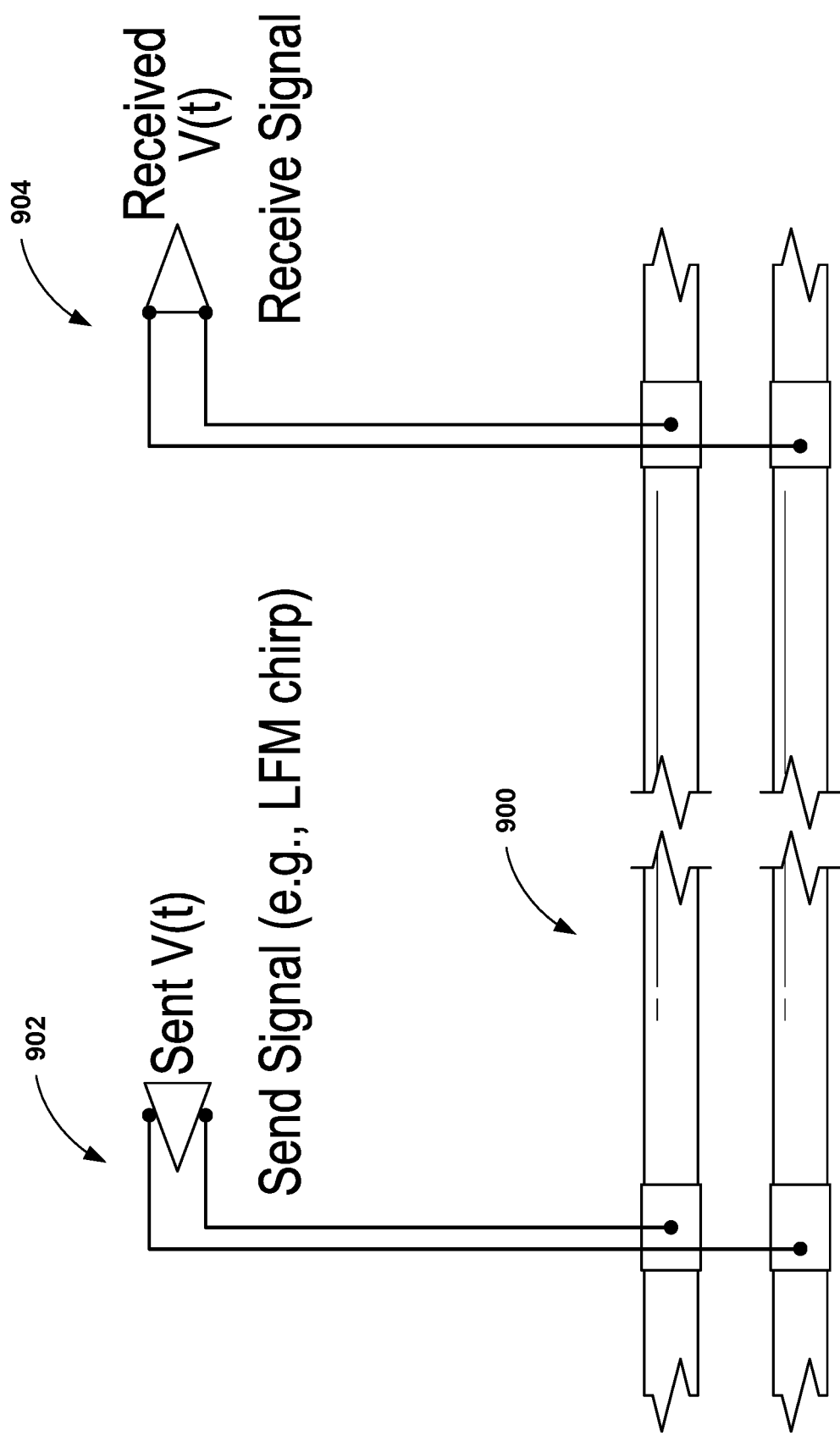
FIG. 9 is a schematic diagram of an example differential coupling system according to techniques of this disclosure.

FIG. 8 is a schematic view illustrating partial discharge (PD) extraction, or in other words, a determination of which of cable A, cable B, or cable C is the source of a detected PD, according to techniques of this disclosure. The physical cable (1, 2, or 3) associated with PD events can be determined by monitoring three or more cables differentially (as shown), and then determining the common events among the pairs. The cable origin of the PD signal can be estimated by observing which different pairs contain the PD signal and which pairs do not. For example, for two pairs in the three-cable system (e.g., pair 1-2 and pair 2-3), a PD signal in cable 1 would be detected only by the first difference 1-2; a PD signal in cable 2 would be detected by both the first difference 1-2 and the second difference 2-3; and a PD signal in cable 3 would be detected only by the second difference FIG. 9 is a schematic diagram of an example differential coupling system according to techniques of this disclosure. An intentional signal (e.g. a linear modulated frequency chirp) is sent from a first node 902 node 202A of FIG, 2) at a given location, and received at second node 904 (e.g., node 202B of FIG. 2) at another location, in order to characterize the transmission line 900, including establishment of its frequency-dependent transmission characteristics. The original signal will have a controlled form that is known to the receiving node 904, and can be analyzed to extract the dispersion, attenuation and impedance mismatches along the line 900. The signal can be sent in one or both directions. A third, fourth, or any number of additional nodes along the line 900 can also receive and send signals for determination of the line-transmission properties. Once the channel is characterized, the received PD signals of interest can be analyzed by one or more receiving nodes, and the location of origin of the PD can be estimated based on the derived transmission line properties. If the distance between the nodes 902, 904 is known, then the attenuation per given distance can be determined and then used to estimate the distance to any given PD source.

Figure 10:
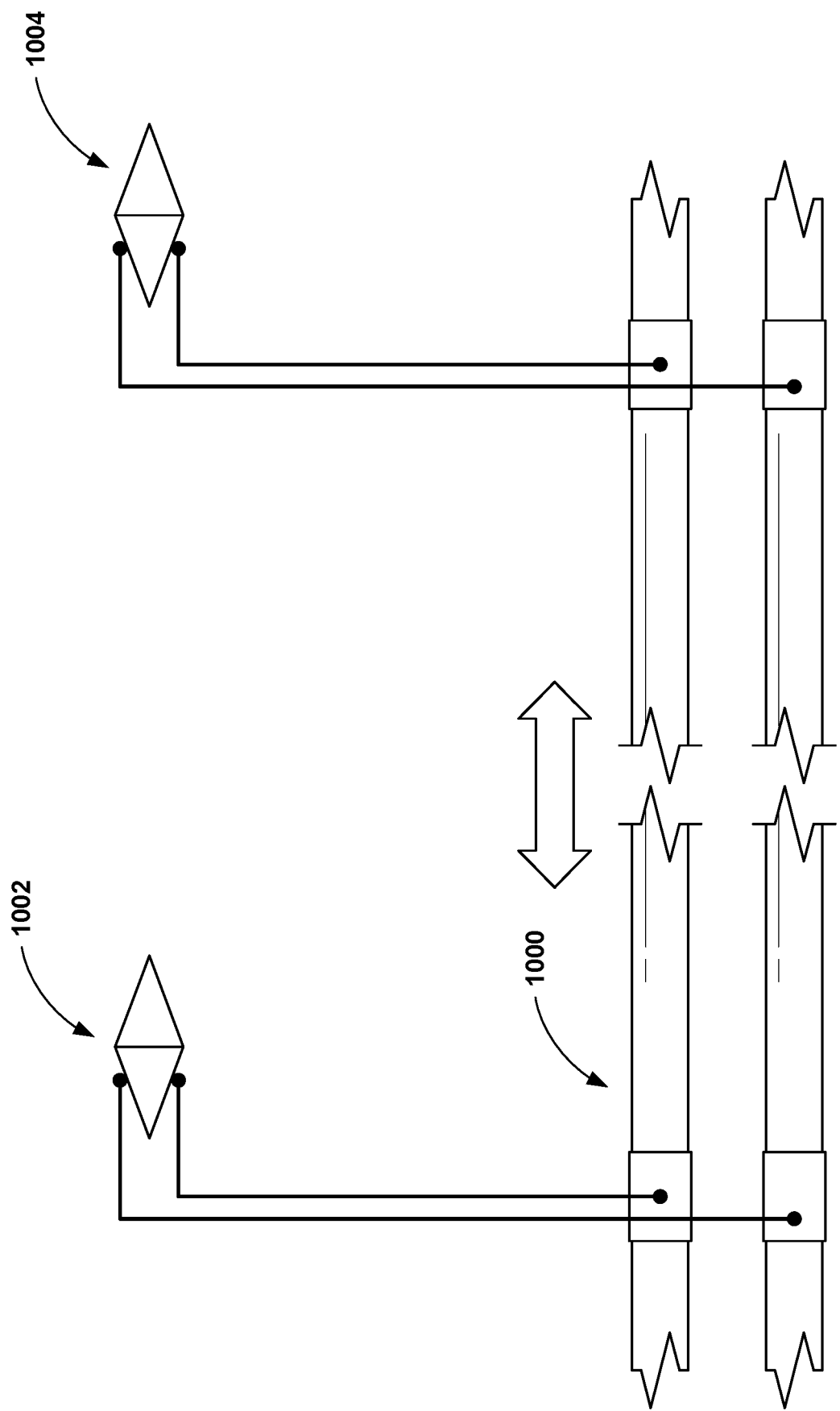
FIG. 10 is a schematic diagram of an example differential coupling system illustrating a measurement method according to techniques of this disclosure.

FIG. 10 is a schematic diagram of another example differential coupling system illustrating a measurement method according to techniques of this disclosure. In a transponder node, a cable propagation delay can be determined through one of many measurements along the cable 1000. For example, an interrogating intentional signal can be sent by a first node 1002 (e.g., node 202A of FIG. 2). When detected by a second node 1004 (e.g., node 202B of FIG. 2), a known intentional response signal could be sent back after a known time delay. The response signal can be detected by the first node 1002 and the time difference between the interrogation signal and the detected response signal can be measured. The delay time and detection time can be subtracted to yield the propagation delay between the two nodes 1002, 1004. With a known distance, the propagation velocity on the physical line 1000 can be determined, or alternatively, if the propagation velocity is known, the distance can be determined. Although two nodes 1002, 1004 are shown, multiple nodes can operate simultaneously in a pair-wise manner as described, or several return signals from several nodes can be generated from the same original signal.

Figure 11:
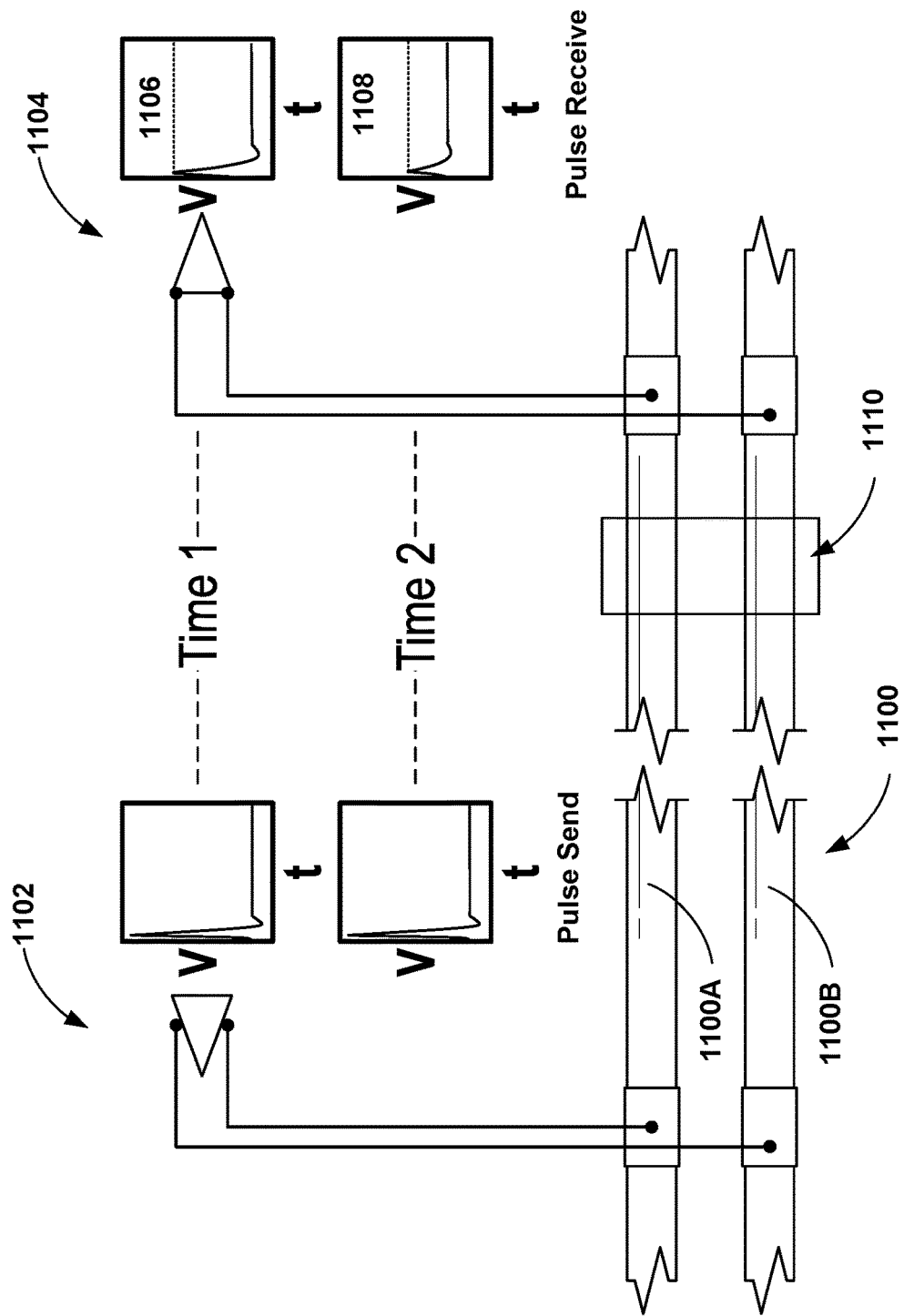
FIG. 11 is a schematic diagram illustrating an example pulse signal injection and extraction according to another embodiment of the invention.

FIG. 11 is a schematic view of an electrical-cable monitoring system, illustrating example techniques for pulse-signal injection and extraction in accordance with this disclosure. An intentional pulse from one node 1102 (e.g., node 202A of FIG. 2) to another node 1104 (e.g., node 202B of FIG. 2) can be used to determine any significant structural changes in the transmission line 1100 over time. For instance, if the receiving node 1104 detects a change between the pulse 1108 received at Time 2 compared to the pulse 1106 received at Time 1 (e.g., due to structural changes at a point 1110 in cable(s) 1100), then the operator can be alerted that a change has occurred. Non-limiting examples of structural changes 1110 include damage to the cable shield 104 or the conductor 112 (FIG. 1), degradation of a splice between the nodes 1102 and 1104, or environmental changes such as water presence and/or temperature changes. Any of these example structural changes may cause a change in electrical impedance at some point 1110 within one or both of cable(s) 1100A, 110013 between nodes 1102 and 1104, and between Time 1 and Time 2, resulting in the observed change in the received pulse 1106, 1108 over time.

Figure 12:
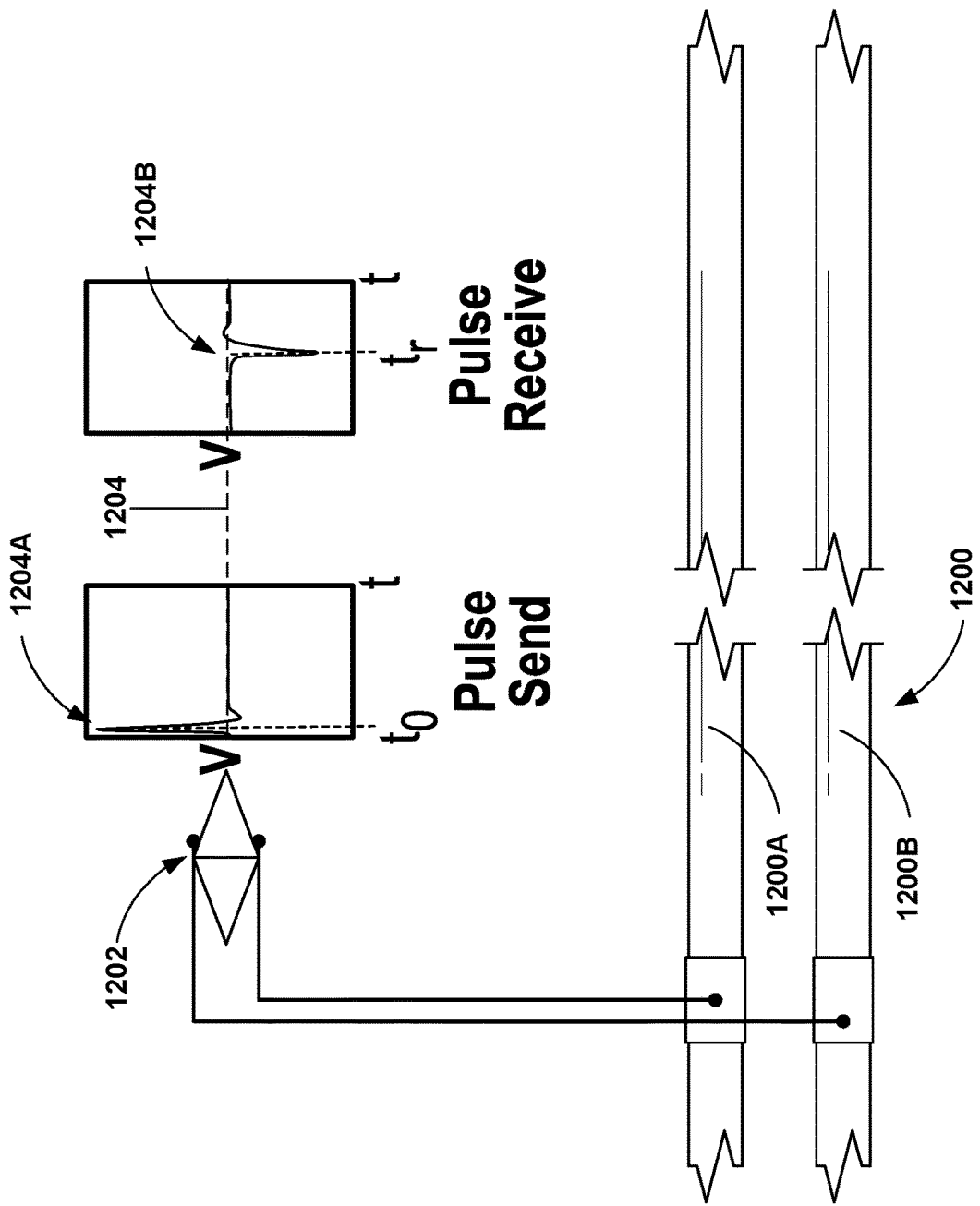
FIG. 12 is a schematic diagram illustrating an example intentional signal extraction according to techniques of this disclosure.

FIG. 12 is a schematic view of another cable-monitoring system, illustrating example techniques for intentional-signal extraction in accordance with this disclosure. A pulse 1204 can be sent (1204A) and received (1204B) by the same node 1202 (e.g., node 202A of FIG. 2) to determine the transmission-line characteristics and also monitor significant changes in the transmission line 1200 that indicate an emerging electric potential or other acute defect, such as damage to the shield 104 or conductor 112 (FIG. 1). The time delay between send (1204A) and receive (1204B) can be used to estimate the distance to the structural element defining an impedance change that is reflecting the signal 1204. The physical cable 1200A, 1200B of transmission line 1200 on which the impedance change is located can be extracted using the combination of responses from multiple lines.

Figure 13:
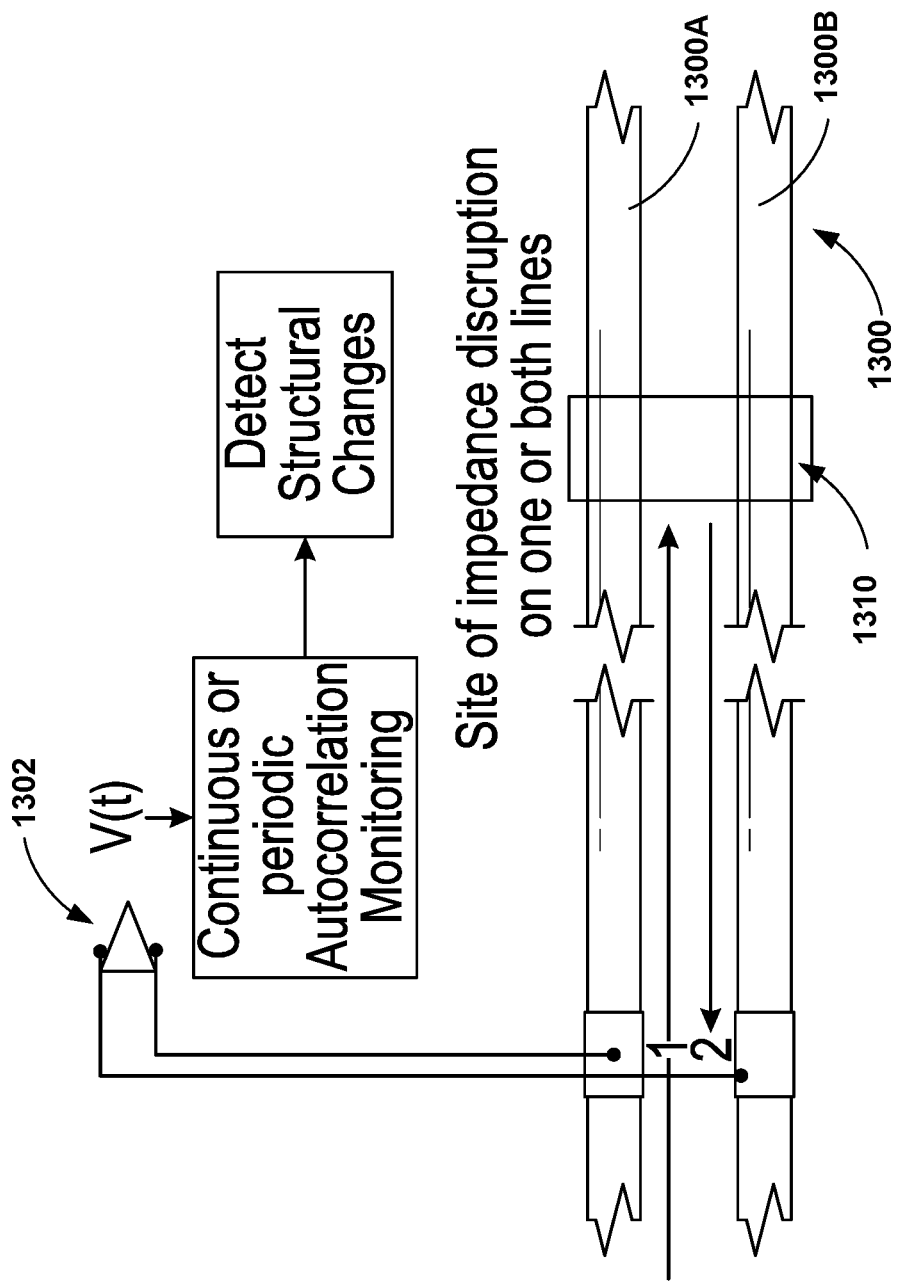
FIG. 13 is a schematic diagram of an example differential coupling system according to techniques of this disclosure.

FIG. 13 is a schematic diagram of another example differential coupling system according to techniques of this disclosure. Voltage monitoring with autocorrelation analysis can be used to detect structural changes or other disruptions 1310 along the cable(s) 1300A, 1300B. A node 1302 (e.g., node 202A of FIG. 2) monitors all voltage variations, regardless of whether they are intentional signals or native noise to the transmission line 1300. For instance, these voltage variations can be the result of pick-up noise, switching noise, PD, intentional signals from a different node, or other causes. The node 1302 then also detects a corresponding reflection of the same voltage pattern as it interacts with an impedance mismatch 1310 along the cable 1300. Autocorrelation analysis can be used to map an original voltage pattern "1" onto a delayed copy of the voltage pattern "2," thereby determining an initial reference state with an intermediate time delay (e.g., determined based on the distance from the voltage reflection at point 1310). A structural change in the physical line 1300A, 1300B will result in a change in the time delay and also possibly a detectable change in the magnitude of the autocorrelated signal. The system can then alert an operator about this change, and can estimate a distance to the structural change 1310 if the propagation delay is known or can be estimated.

Figure 14:
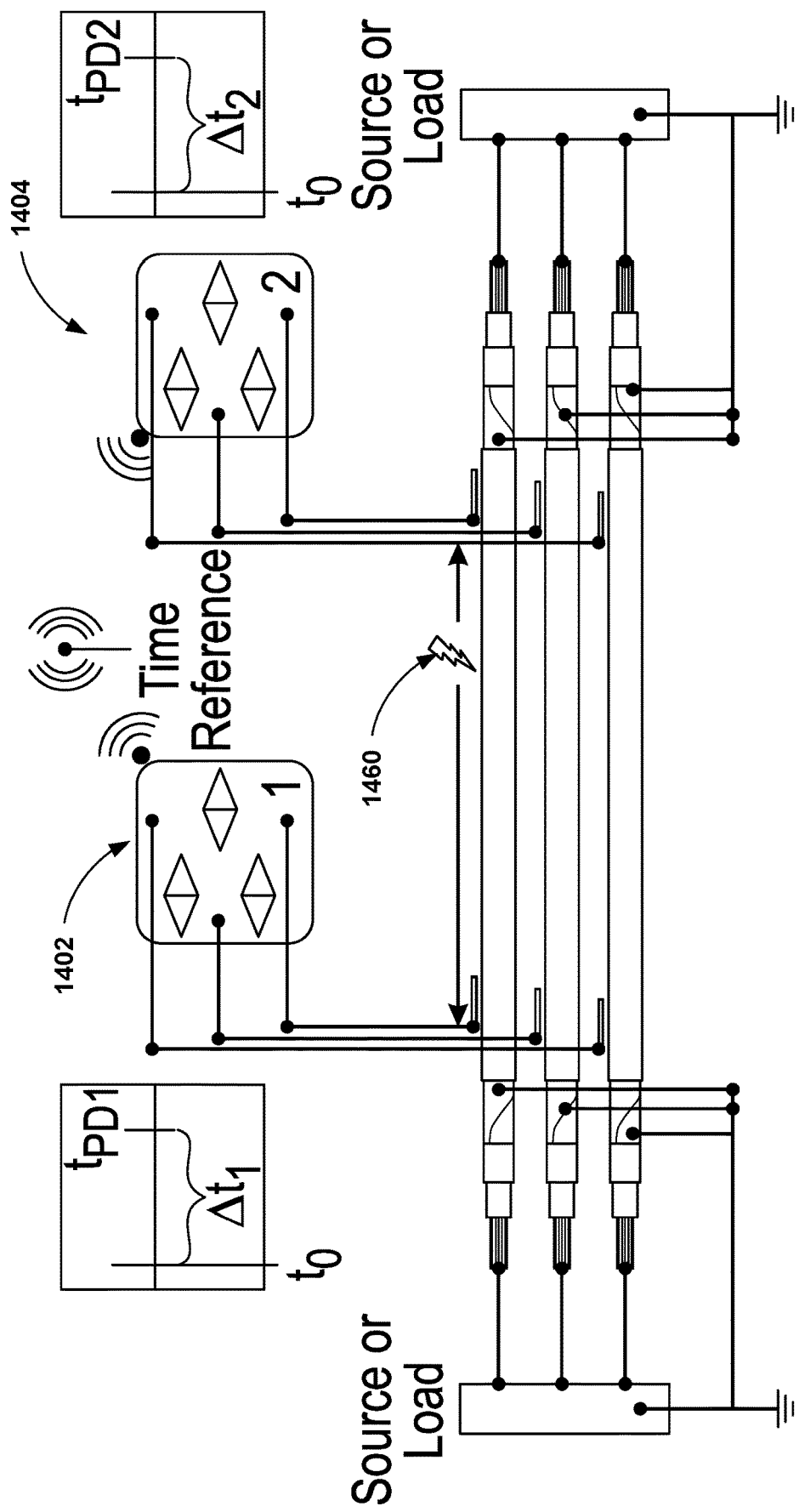
FIG. 14 is a schematic diagram of an example differential coupling system as utilized to determine the location of a partial discharge source, according to techniques of this disclosure.

FIG. 14 is a schematic diagram of another example differential coupling system as utilized to determine the location of a PD source 1460, according to techniques of this disclosure. One method to estimate the location of a PD source 1460 between two or more detection sites 1402, 1404 (e.g., nodes 202 of FIG. 2) is to synchronize the clocks at each site and record the arrival time of a PD event at both sites. The synchronization can be wired or wireless GPS-based), The PD arrival time relative to the absolute time is recorded for each site 1402, 1404 and the sites then communicate the information to a central location, to a signal-concentration location, or to another location, and the difference in PD-event-arrival time is calculated. This time difference is then used to estimate the relative location 1460 between the sites 1402, 1404, If the site separation is known, then the distance to the PD source 1460 from one of the locations 1402, 1404 can be determined.

Figure 15:
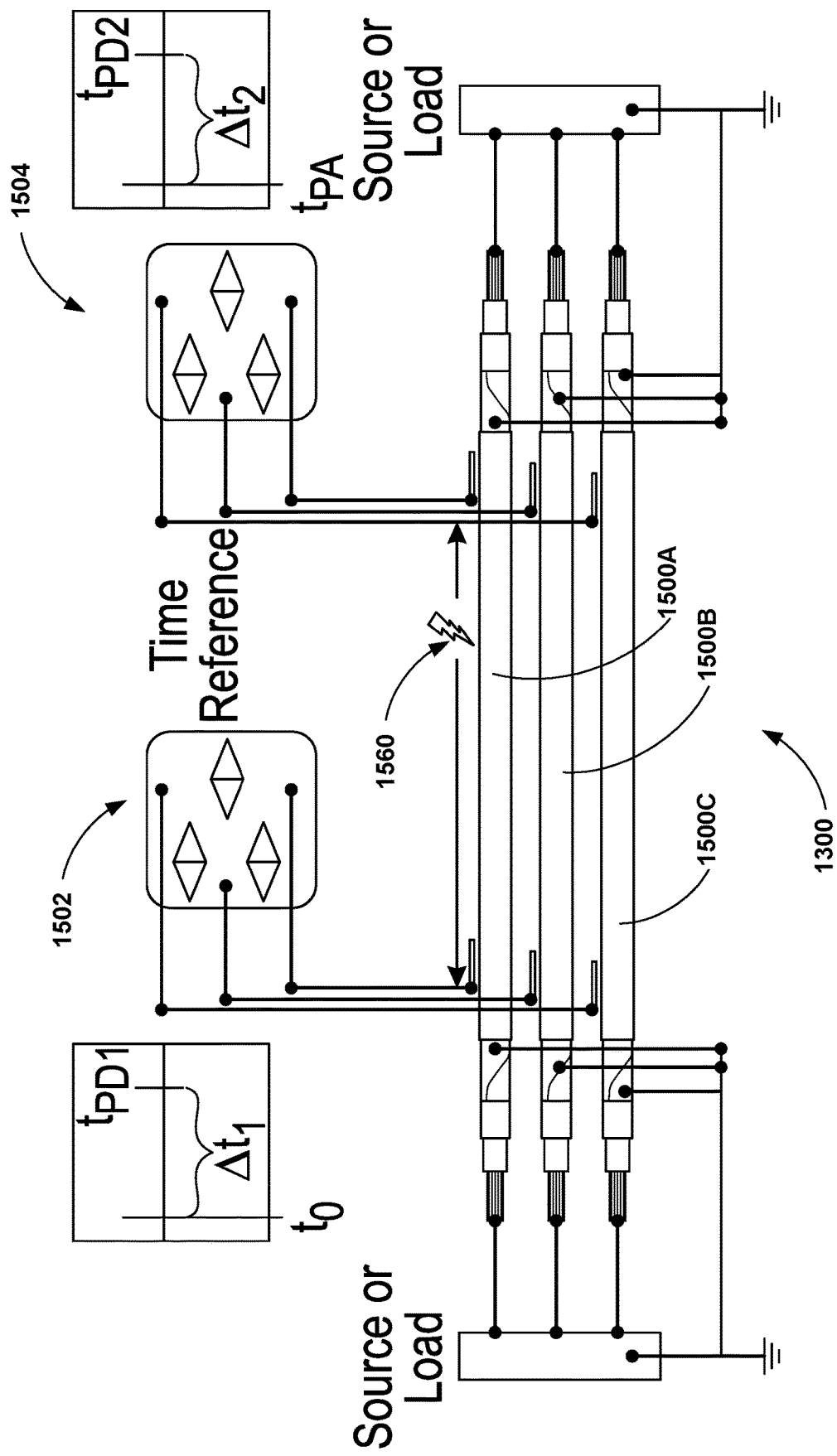
FIG. 15 is a schematic diagram of an example differential coupling system as utilized to determine the location of a partial discharge source, according to techniques of this disclosure.

FIG. 15 is a schematic diagram of another example differential coupling system as utilized to determine the location of a PD source 1560, according to techniques of this disclosure. Another method of determining the PD source 1560 is to use a timing signal sent along the cables 1500A-1500C from one or more sites 1502, 1504 (e.g., nodes 202 of FIG. 2), where the PD-signal arrival time and the timing-signal arrival time are measured. In some such examples, node 1502 sends the timing signal, and the PD signal is measured relative to the timing of the timing signal sent at node 1502 and the received timing signal received at node 1504. Comparison of these time differences provides an estimation of the location of PD source 1560. Knowledge of the propagation delay on the line 1500 can further improve the estimation of the location of PD source 1560.

Various examples of the systems (e.g., assemblies), devices (e.g., nodes) and techniques (e.g., methods) described herein can be utilized in power-line monitoring, and can include the following example configurations, which are shown and described with respect to FIGS. 2-15, as referenced and described above. In a first example configuration, illustrated generally in FIGS. 4 and 5, a cable-monitoring device (e.g., node 402, node 502) includes a capacitive coupling 120 to the ground shield 104 of a cable 100 and to a local ground 420. This configuration can provide the following functionality: (1) provision of a system with other nodes (404, 406, 504, 506) that inject an intentional signal using the same or other means: (2) detection of native system signals, like partial discharge signals; (3) detection of intentional signals generated at another node; (4) detection of return signals sent from the same node; and (5) the use of adaptive noise cancellation to remove common-mode noise between cables 100 (400, 500), so as to leave only the phase-unique PD signal.

In a second example, a device (e.g., node 202A of FIG. 2) of a cable-monitoring system includes a capacitive coupling 120 to the ground shield 104 to two or more power cables (100A-100C) and provides differential noise rejection for receiving intentional and native signals on the cables. This configuration can provide the following functionality: (1) provision of a system that uses intentional signal injection with differential and capacitive coupling or other means as in FIGS. 2, 4, 6, 9, 10, 11, and 12); (2) detection of native system signals like PD (e.g., as in FIGS. 4 and 8); (3) detection of intentional signals generated at another node (e.g., as in FIGS. 9, 10, and 11); (4) detection of return signals sent from the same node (e.g., as in FIG. 12); (5) the use of more than one differential coupling pair to discriminate which power line 100 contains the signal of interest (e.g., as in FIGS. 8); and (6) the use of adaptive noise cancellation to remove common-mode noise between cables 100, so as to leave only the phase-unique PD signal.

In another example, a device (e.g.. node 202A of FIG. 2) includes the use of a current sensor e.g., high-frequency current transformer, or "HFCT") fitted on one or more cables 100 and measuring the net current in the cable(s) 100, in conjunction with the capacitive sensors and adaptive noise-cancellation algorithms to remove noise from the signal.

In yet another example, a device (e.g., node 404 of FIG. 4) includes a differential inductive coupling to the cable shields 104 or ground extensions to two or more cables 100 (e.g., between the cables 100) for intentional signal injection or extraction, or native signal extraction. This example configuration can be used in a system with at least another node with the same or other coupling.

In yet another example, a device includes a capacitive coupling 102 to the ground shield 104 of a cable 100 and to a local ground 420, and injects an intentional signal (e.g., as in FIGS. 4 and 5).

In yet another example, a device includes a capacitive coupling 120 to the ground shields 104 of two or more cables 100 and differentially injecting an intentional signal (e.g., as in FIG. 2). This example configuration can be utilized in in a system with other nodes that inject intentional signal using the same or other means (e.g., as in FIGS. 2, 4, 6, 7, and 9-12). Available functionality includes communication, for example, where capacitive coupling 120 (to the cable shields 104) enables the creation of a differential data channel on a pair of cables 100 (e.g., as in FIGS. 2, 4, 6, 7, and 9-12); and the communication can be multiplexed along more than one pair of cables 100. Available functionality also includes channel characterization, where, for example, channel frequency response measurement using known signal (e.g., a chirp or pulse) injection (e.g., as in FIG. 9) can be accomplished. The channel characteristics can be used to: (1) estimate distance to PD source based on measured PD signal shape; (2) monitor the condition or environmental changes along the cable length over time such as temperature, water content in and around the cable, and dielectric degradation; (3) sense the presence of existing or emerging structural defects or changes in the grid layout (switch position, new equipment or branches); (4) provide propagation delay estimation by measuring time delay from launch of a signal to the reception of a signal over a known or estimated distance; and/or (5) measure the time of flight and infer the distance between nodes, by sending a signal from one node to the other and sending back a response within a known time period (e.g., as in the "transponder" example of FIG. 10).

In yet another example configuration, a cable-monitoring system can also be used for anomaly detection and localization. In this example configuration, the system can provide, for example, time synchronization, e.g., repeated synchronization-signal injection at some or all nodes used by receiving node side to lock-on-to and synchronize its local clock, followed by receiving and reporting arrival (or launch) local times of this signal and native signals (e.g., PD signal) of interest at this node and others (e.g., as in FIGS. 14 and 15); passive TDR using native noise and anomalies and autocorrelation analysis to detect emerging structural changes in the power lines 100 or equipment (e.g., as in FIG. 13); active TDR using injected intentional signals, such as pulses or wideband chirps, and listening for reflections from faults and structural changes (e.g., as in FIGS. 11 and 12); pulse transmission from one node to another to detect structural changes between the two nodes, including grid layout such as switch position and new equipment or branches (e.g., as in FIG. 11); and/or repeated time of flight (ToF) measurements to monitor changes in the cable properties, due to, e.g., temperature changes, water presence or ageing between two nodes. (e.g., as in FIGS. 9-12).

Figure 16:
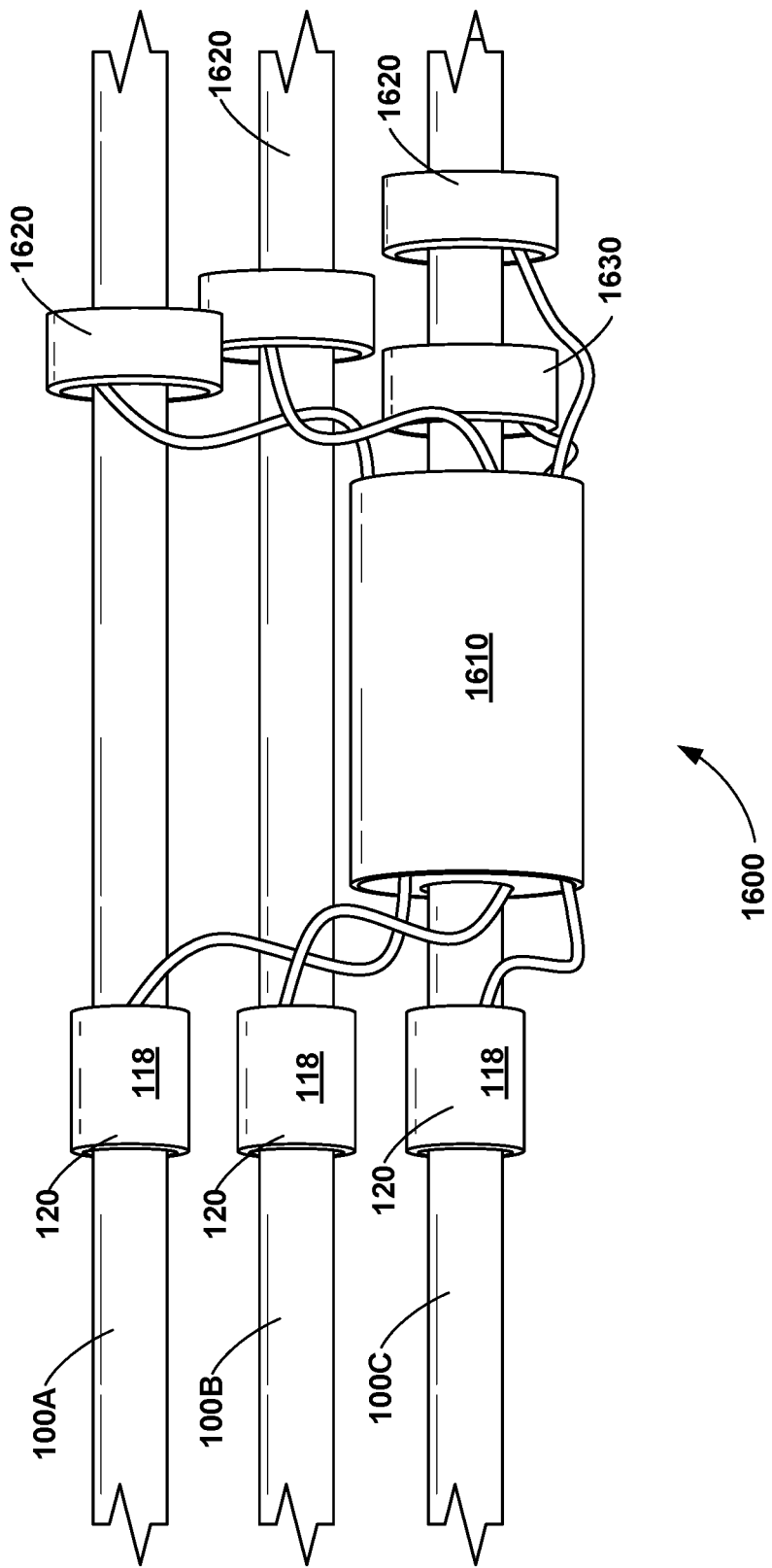
FIG. 16 is a schematic diagram of an example retrofittable device, according to techniques of this disclosure.

In yet another example, FIG. 16 shows an example device enabled by the coupling techniques of this disclosure (e.g., the capacitive coupling as shown and described with respect to FIGS. 2 and 3), having some or all of the example functionalities described above. More specifically, FIG. 16 is a schematic diagram of an example cable-monitoring device 1600, configured to be retrofittable on power cables 100A-100C, and utilizing capacitive coupling 120 for one or more functions (non-limiting examples of which are provided herein). Common-mode noise can be reduced through the use of differential signal injection and extraction. The main hardware unit is mounted on a cable in this example, but can be placed on anywhere locally. Also, some or all the components can be integrated (e.g., combined) into fewer discrete components than those shown in FIG. 16.

As shown in FIG. 16, cable-monitoring device 1600 includes a main hardware unit 1610, a set of capacitive couplings 120 (as described above), additional sensors 1620, and an optional energy-harvesting unit 1630.

Main hardware unit 1610, in conjunction with the other components of FIG. 16, is configured to provide the example functionalities described above, including, but not limited to: PD signal extraction, measurement, and analysis; PD localization; power regulation (e.g., via power-regulation circuitry); transmission and receipt of data communication along cables 100; wireless communication; transmission and receipt of time-synchronization signals; autocorrelation analysis (e.g., of corresponding voltage signals, as described above); electrical-impedance measurement; TDR; FDR; fault detection and localization; temperature measurement; current measurement; FCI with logic; power-quality analysis; reverse-power-flow analysis; waveform capture and analysis; incipient fault detection; structural anomaly detection; gas or liquid (e.g., water) detection; and functionality as a transponder for signal-propagation delay.

As described above (e.g., with respect to FIGS. 2 and 3), capacitive couplings 120 may each include a foil-like conductor 118 wrapped around at least a portion of cable jacket 102 (as shown in FIG. 17), so as to capacitively couple main hardware unit 1610 to cable shield 104 (FIG. 1) of each cable 100, Additional sensors 1620 may include, as non-limiting examples, temperature sensors, current sensors (e.g., Rogowski coils), chemical sensors, high-frequency current transformers, or other sensors. Energy harvesting unit 1630 is inductively coupled to cable 1000 in order to draw electrical energy in order to power the functionality of main hardware unit 1610.

FIGS. 17A-17C show example components of a capacitive coupling device (or a "capacitive coupling") of a node of a cable-monitoring system for a single-phase cable. More specifically, FIGS. 17A-17C are cross-sectional views of power cable 100A of FIG. 1, illustrating example placements for capacitive couplings 1720B, 1720C, which are examples of capacitive coupling 120 of FIG. 3. As shown in FIG. 17B, the capacitive coupling 1720B can be added to a portion (e.g., less than a whole) of the cable periphery (e.g., outer perimeter or circumference). Alternatively, in the example shown in FIG. 17C, the capacitive coupling 17200 can be added around the entire cable periphery.

As shown in FIG. 17B, capacitive coupling 1720B can include an outer dielectric cover or housing 1722; an optional ground plane 1724 and dielectric separator 1726, configured to minimize the reception of external electromagnetic interference (EMI); and a sensing (e.g., conductive) layer 1728, which is an example of foil layer 118 of FIG. 3.

The capacitive couplings 1720B, 1720C can be implemented with an electrical equipment management system (EEMS), such as cable-monitoring device 1600 of FIG. 16, for monitoring electrical power cables 100 of an electrical power grid. The EEMS may allow authorized users to manage inspections, maintenance, and replacement of electrical equipment for a power grid and to adjust operation of the power grid.

In general, the EEMS can provide data acquisition, monitoring, activity logging, data storage, reporting, predictive analytics, and alert generation. For example, the EEMS may include an underlying analytics engine for predicting failure events of articles of electrical equipment, and/or an alerting system for reporting the predicted failure events, in accordance with various examples described herein. In general, as used herein, a "failure event" may refer to the interruption of electrical-power delivery between an electrical-power source and an electrical-power consumer, for example, caused by deterioration or breakage of an article of electrical equipment (e.g., a cable splice).

The EEMS can provide an integrated suite of electrical equipment management tools and implements various techniques described herein. That is, the EEMS can provide a system for managing electrical equipment (e.g., electrical cables 100, splices, transformers, etc.) within one or more physical environments, which may be cities, neighborhoods, buildings, construction sites, or any physical environment. An example EEMS and components thereof are described in commonly assigned International Patent Application No. PCT/US2019/049801, entitled "ELECTRICAL POWER CABLE MONITORING DEVICE USING LOW SIDE ELECTRODE AND EARTH GROUND SEPARATION," filed Sep. 5, 2019, and incorporated by reference in its entirety herein.

As described herein, for some applications it is desirable to retrofit a power-line monitoring-and-communication system onto existing medium-voltage (MV) or high-voltage (HV) cables of a multiphase electric power line, e.g., as described above in reference to FIG. 1. For example, it may be advantageous to retrofit multiphase electrical power lines without compromising the integrity of the cables, e.g., by cutting the cables or penetrating the cable jacket 102. This can be done by capacitively coupling a coupling layer 118 to the cable shield 104, as described above.

In accordance with techniques of this disclosure, FIGS. 18-25 illustrate specific examples of these types of detection, monitoring, and communication systems that are particularly configured to detect near-source (or "local") PD signals (e.g., originating from within about 10 meters from a detector), or in other words, PD signals that each originate from a location on the cable that is relatively close to a sensor (e.g., coupling layer 118) of a sensing node of the respective monitoring system. For instance, as detailed further below, local PD signals include specific properties that may be advantageously exploited for detection purposes, as compared to relatively far-source ("remote") PD signals (e.g., originating from farther than about 10 meters from a detector) which, among other disadvantages, may be difficult to distinguish from other electrical noise "native" signals) within the alternating current (AC) of the cable.

PD signals typically include electrical energy distributed across a broad frequency range, e.g., having orders-of-magnitude from Hertz (Hz) to giga-Hertz (GHz). While PD signals may exhibit signal-attenuation as a function of increasing distance from the PD source location, higher-frequency PD signals are typically attenuated at a higher rate (e.g., on the order of dB/meter) than lower-frequency PD signals. Accordingly, higher-frequency signals can only be practically detected at a limited distance (e.g., within a threshold distance range) from the PD source location.

Other native electrical signals, such as random noise signals, are typically attenuated in a similar manner and by similar mechanisms, e.g., only exhibiting significant power (e.g., signal amplitudes) within relatively lower frequency ranges at any particular point along a cable. Sonic non-limiting examples of sources of this random noise include partial discharge from other (remote) sources along the cable, radio frequency (RF) pick-up, system switching, electronic switching. electromagnetic (EM) pulses from connected electrical equipment, lightning strikes, and thermal noise, among others.

For these reasons, at "local" locations along the cable that are relatively close to a PD source (e.g., within about 10 meters from the PD source), higher-frequency content of the PD signal is more-easily distinguishable from the noise signals, or in other words, exhibits a higher signal-to-noise ratio compared to cable locations that are farther from the PD source. Accordingly, systems and techniques of this disclosure are configured to exploit this property to more-easily (and at lower costs) extract (e.g., detect and identify) local PD signals, compared to PD signals that propagate a longer distance from the PD source, in which case only lower-frequency PD signal content remains that is substantially more difficult and more expensive to extract from background noise. For instance, power-line monitoring systems described herein include a node having a relatively low-complexity, low-cost, and low-power circuit that can be used for this type of high-frequency PD-signal detection. For example, as described with respect to FIGS. 18-25, power-line monitoring systems of this disclosure may include a high-pass filter configured to reduce lower-frequency content from an electrical signal, a peak detector configured to identify higher-frequency peaks within the filtered electrical signal, and a microcontroller or other processing circuitry configured to detect the PD event based on the identified peaks, extract a corresponding timing and an amplitude of the PD event, analyze the signal indicating the PD event, and in some examples, generate a statistical representation depicting a historical frequency of detected PD events at a particular location over time.

Figure 20:
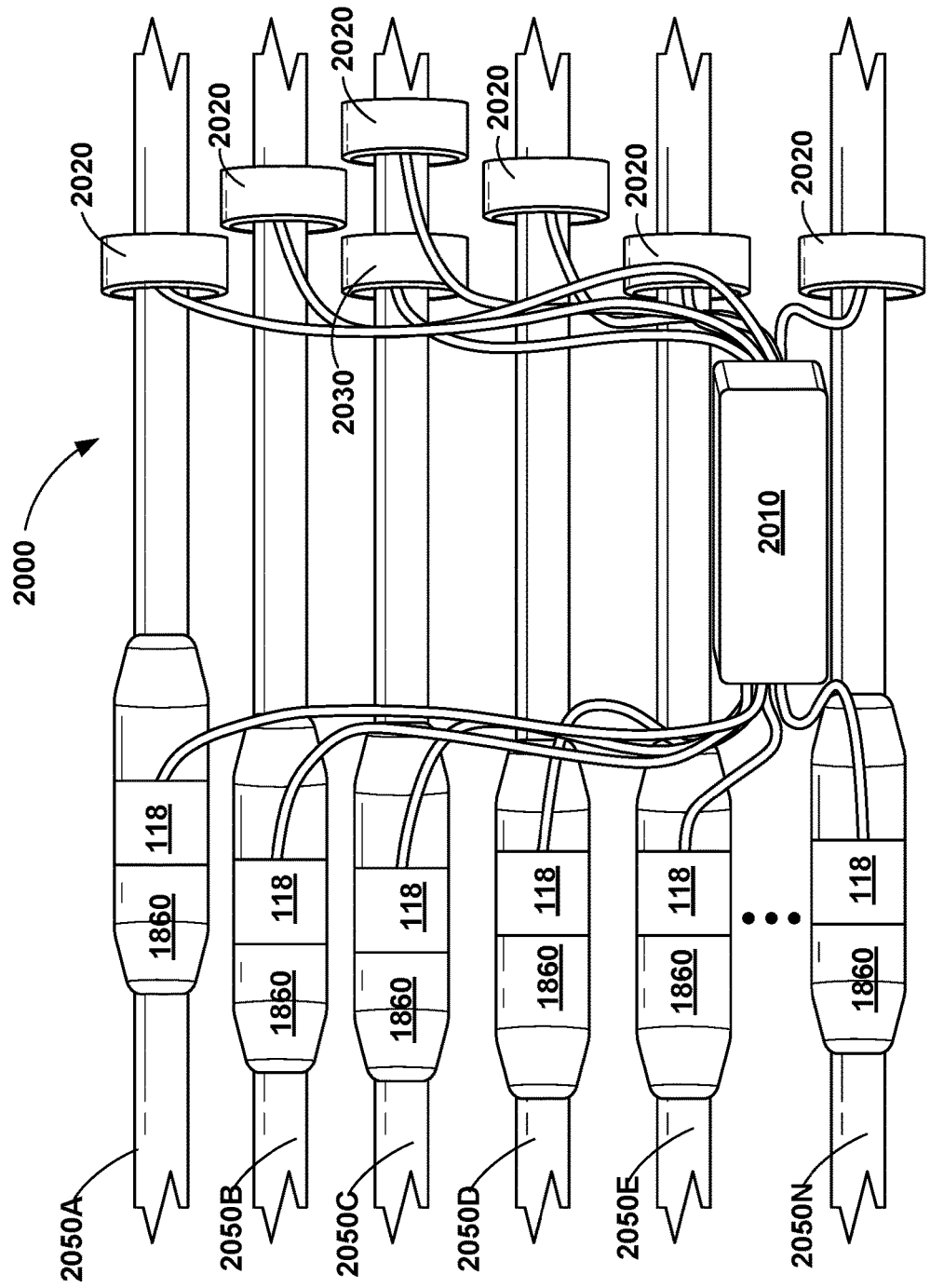
FIG. 20 is a schematic diagram illustrating another local partial discharge detection system, according to techniques of this disclosure.

After a sensing node detects a PD event, then the sensing node may communicate either (1) an individual data point representing the PD event, or (2) the statistical data representing many historically detected PD events, over a relatively longer distance with the power-line-communication techniques described above, or through other communication means, to another node or nodes of the power-line-monitoring system. In some examples, sensing nodes of this disclosure may be designed to operate on relatively low levels of power, for example, as compared to typical high-frequency digital samplers. In some such examples a sensing node may include a low-complexity and low-cost inductive power-harvesting system (e.g., as shown in FIGS. 16 and 20).

A further advantage the systems and techniques of this disclosure is that, by performing local detection of a PD-signal, the source location of the PD event is either directly known (e.g., corresponding to the known location of the PD-detecting sensor), or is easily identifiable from among a limited set of potential source locations (e.g., corresponding to the locations of a set of sensors, one of which being the PD-detecting sensor). Accordingly, local-PD-monitoring systems described herein do not need to implement complex source-identification circuitry and algorithms for performing time synchronization between nodes to locate a PD event which may occur at virtually any location along a cable. As one specific example, for networks (e.g., electric grids) that incorporate branching of cables, previous PD-locating techniques may still, in some cases, be unable to identify a branch, or a particular cable segment of a branch, as the source of the PD event. By comparison, the techniques described herein advantageously identify the PD source location based on the identity of the sensing node that detects the PD event.

As one example, a sensing node that detects a PD event may be configured to report (e.g., output) a signal indicating both the PD event data and a unique sensing-node identifier, which can then be cross-referenced to determine the physical (e.g., geographical) location of the sensing node. In other examples, the sensing node can. output a direct indication of its physical location, enabling an operator to quickly reach and address the cause of the PD event prior to cable failure.

The local-PD-detection techniques and systems described herein are particularly advantageous when applied to a system (e.g., an electrical grid, a multiphase electric power line, or other cable system) having a limited number of small, distributed locations that are inherently more likely to fail through partial discharge. Non-limiting examples of these types of locations include cable accessories, such as cable splices and terminations, and other electrical equipment coupled to one or more cables.

A sensing node placed at or near these types of locations (e.g., within about 10 meters of one of these locations, such as about 5 meters, or preferably within about 1 meter) may be configured to determine and automatically report, on a continuous or semi-continuous (e.g., periodic) basis, about a monitored development of PD emissions that may indicate of an elevated risk of cable failure. Example reports may include PD parameter data indicating, as non-limiting examples, a PD-signal magnitude, a number of detected PD events per unit time, a phase relationship between a PD event and the background AC power signal, and a statistical distribution of detected PD events over time. In particular, the magnitude (e.g., amplitude) of a detected PD signal can be measured and assessed more accurately if the PD event occurs relatively close to the sensing node.

After determining these types of PD parameters, a power-line-monitoring system may be configured to determine (e.g., predict), based on the PD parameters (e.g., signal magnitude), a corresponding risk of cable failure for each PD-source location. In some examples, the monitoring system may perform a comparison of the PD parameters between the different source-location sites in order to provide a relative prioritization a priority ranking) among the various source-location sites, such that an operator can more-efficiently inspect, repair, or replace the PD-source locations.

In a further example herein, a power-line-monitoring system (e.g., a local-PD-detection system) including a plurality of nodes configured to monitor potential PD-source locations, can determine and store data indicating a trending progression of cable damage over time. In some such examples, the monitoring system may further be configured to apply the damage-progression data as training data for one or more machine-learning algorithms, in order to estimate a subsequent rate of damage progression in, for example, newly installed power lines that have exhibited PD-progression signal patterns. In cases in which the monitoring system detects actual cable failures, the monitoring system may use the damage-progression data for the failed cables in order to generate more-accurate predictive-failure algorithms, and use the algorithms on subsequent PD parameter data derived from PD-event source locations that are determined to be progressing toward cable failure.

As noted above, example power-line-monitoring systems herein may be configured to monitor cable accessories as high-risk sources for partial discharge events. In such examples, the local retrofit capacitive-coupling techniques described herein can be applied directly to splices or terminations, or in other examples, at locations on the cable that are relatively near these accessories.

The capacitive-coupling techniques described herein can be applied in either the single-ended configuration (e.g., using a node coupled to a single cable and a local ground) or the differential configuration (e.g., using a node capacitively coupled across two or more cables). As noted above, and as shown in FIG. 24, in single-ended configurations, the PD-source location is directly identifiable as the location of the capacitive sensor that detected the PD signal.

By comparison, in differential configurations, the PD-source location can be on any one of the cables to which the node is capacitively coupled. Accordingly, the techniques of this disclosure include methods and systems for identifying the particular cable hosting the PD-source location, as described below with respect to FIGS. 22 and 23. For instance, in a differential configuration including "n" number of cables, a local-PD-detection system requires a minimum of (n–1) differentially coupled detection circuits (e.g., for three cables, two differential detection circuits are needed). In other examples, if the specific cable where the PD event is occurring is not immediately known nor readily discernable (e.g., due to less than n–1 nodes present within the monitoring system), but the PD event is of sufficient concern (e.g., based on signal magnitude or other indication of relative severity), then the power-line-monitoring system may be configured to direct additional inspection activity to the area near the sensing node(s) to determine the exact location of the damage (e.g., through visual, thermal, or electromagnetic-based detection techniques).

Figure 18:
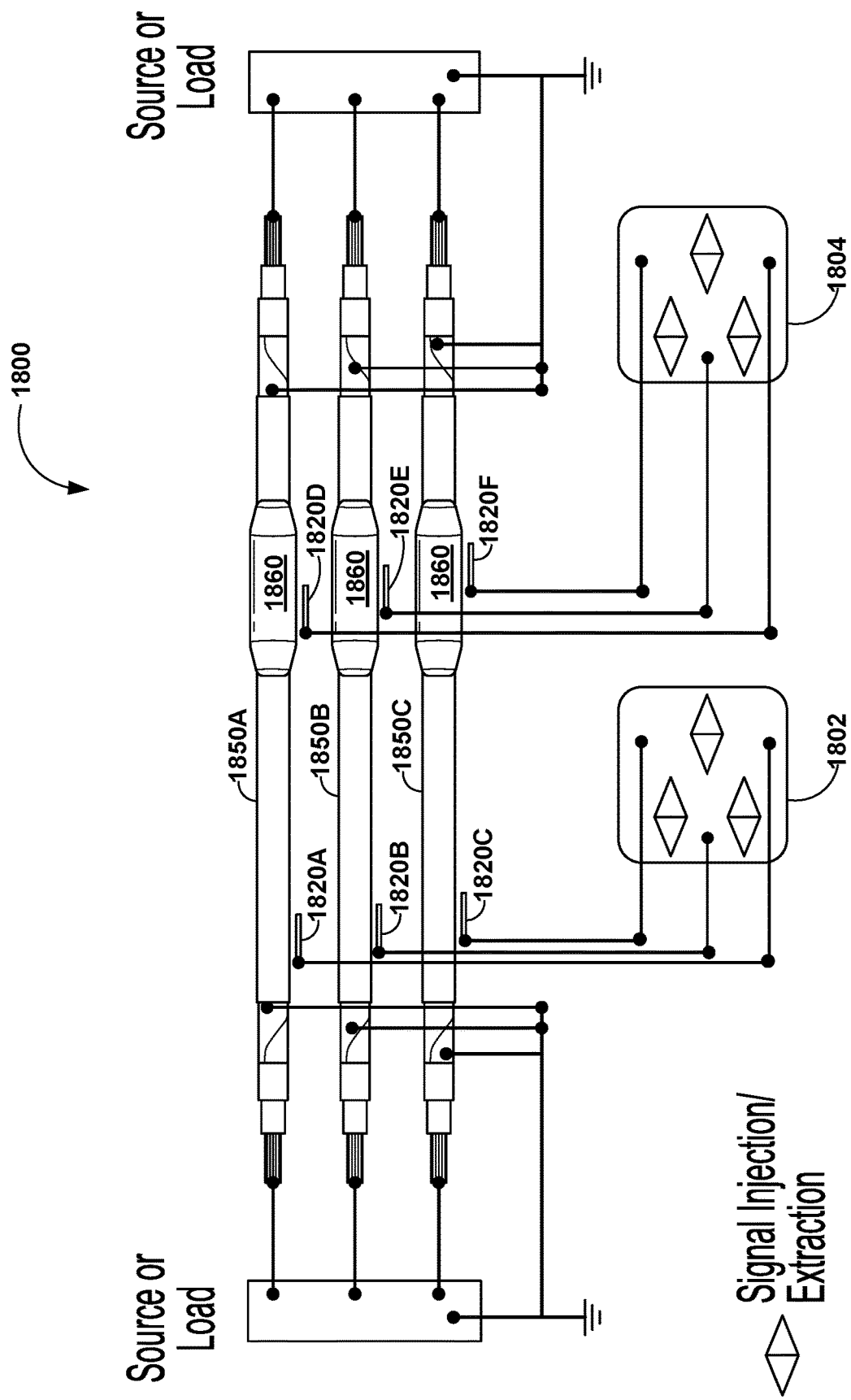
FIG. 18 is a schematic diagram illustrating a first example power-tine-monitoring system 1800 configured to detect local partial discharge (PD) events within an electric power line, in accordance with this disclosure.

FIG. 18 is a schematic diagram illustrating a first example power-line-monitoring system 1800 configured to detect local partial discharge (PD) events within an electric power line, in accordance with techniques of this disclosure. System 1800 includes two mid-span sensing nodes 1802 and 1804. In other examples, local-PD-detection systems in accordance with techniques of this disclosure may include more, fewer, or different nodes than those depicted in FIG. 18.

Sensing node 1802 includes capacitive sensors 1820A-1820C located along continuous segments of electric cables 1850A-1850C, respectively. By comparison, sensing node 1804 includes capacitive sensors 1820D-1820F located along non-continuous segments of electric cables 1850A-1850C. More specifically, each of sensors 1820D-1820F includes a coupling layer (e.g., the same as or substantially similar to foil 118 of FIG. 3) disposed around a cable splice 1860 configured to join two adjacent segments of the respective electric cable. Capacitive sensors 1820A-1820F may be the same as or substantially similar to capacitively coupled sensors 120 described above in reference to FIG. 3, except for the differences described herein. Additionally, electric cables 1850A-1850C may be the same as or substantially similar to cables 100A-100C described above in reference to FIG. 3, except for the differences described herein.

Sensing nodes 1802, 1804 are configured to communicate, via sensors 1820, with each other and/or with any other nodes shown and/or described throughout this disclosure, through the communication techniques described above (e.g., via injection and detection of intentional signals within cables 1850).

As described above, sensors 1820 of local-PD-detection system 1800 may be intentionally placed at or near locations along the cable(s) 1850 that are at relatively higher risk of experiencing partial discharge events, such as at or near cable splices 1860, cable terminations, or other cable accessories, as compared to other locations along a substantially continuous segment of the cable 1850. As one example, sensors 1820 may each be placed along a cable within about 10 meters of a high-risk cable location, such as within about 10 meters, or preferably within about 1 meter.

In particular, FIG. 18 depicts an example differential configuration of system 1800, including differential capacitive couplings 1820 of communication devices (e.g., either of nodes 1802, 1804) to the shield layers 104 (FIG. 1) of a cable pair (e.g., any two of cables 1850). In example power lines having three cables, as shown in FIG. 18, there are three potential cable pairs that are available for a node 1802, 1804 to be capacitively coupled across. In general, for multi-cable power lines having (n>3) number of cables, there exist n!/2 number of unique cable pairs available for differential coupling. As described above, a communication signal (e.g., an intentional signal) can be multiplexed or repeated on these multiple pairs. The communication signal can be extracted from a similarly coupled node at a remote location. Using sensors 1820, each node 1802, 1804 is capable of performing any or all of local PD signal sensing; communicating (e.g., sending and receiving) intentional communication data; functioning as a repeater device to send the information along the respective cable 1850; or concentrating collected information for transmission to a central location.

Figure 19:
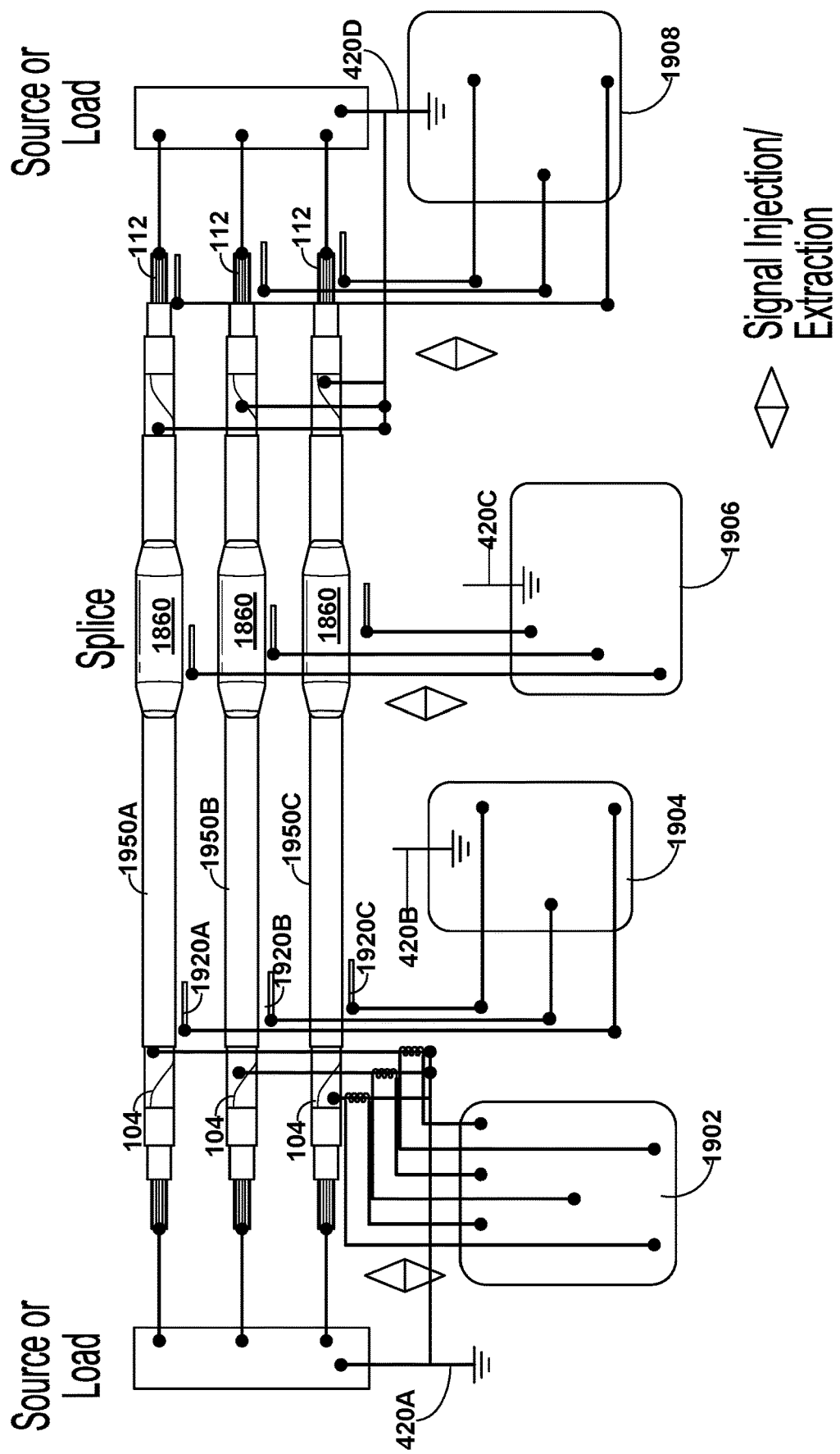
FIG. 19 is a schematic diagram illustrating various techniques for coupling nodes to cables of an electric power line, in accordance with techniques of this disclosure.

FIG. 19 is a schematic diagram illustrating example techniques for coupling nodes 1902, 1904, 1906, 1908 to cables 1950A-1950C of an electric power line, in accordance with techniques of this disclosure. In the example of FIG. 19, there can be several different methods for coupling nodes 1902-1908 to cables 1950.

For instance, node 1902 is inductively coupled to cable shields 104, overtop of connections between cable shields 104 and ground 420A. Node 1902 represents a differential coupling configuration, e.g., is differentially coupled across every potential cable pair of cables 1950. Additionally, this configuration represents a "one phase each" differential coupling, because node 1902 includes a separate inductive coupling to each of the three cables 1950A-1950C.

Node 1904 is an example of a hybrid between a single-ended-coupling configuration and a differential-coupling configuration. For instance, node 1904 includes a separate sensor 1920 that is capacitively coupled to a respective one of cables 1950, as described above (e.g., capacitively coupled to shield 104 overtop of jacket 102). However, node 1904 is additionally coupled to a local ground 42013. Accordingly, node 1904 includes a differential coupling between any two of sensors 1920, and also a single-ended coupling between local ground 420 and any one of sensors 1920. Node 1906 includes a similar configuration to node 1904, except that node 1904 is capacitively coupled to segments of cables 1950 that are near (e.g., local to) cable splices 1860, whereas sensors of node 1906 are capacitively coupled directly overtop of cable splices 1860.

Node 1908 includes sensors that are capacitively coupled to central conductors 112 of cables 1950. Since node 1908 also includes a local ground 420D, node 1908 is an example of a single-ended coupling configuration, having a connection between local ground 420 and any one of the sensors. As described above, each node 1902-1908 is capable of sensing signals traveling within cables 1950, collecting intentional data transmitted through cables 1950, or transmitting intentional communications from the respective node for transmission through the cables 1950 for receiving at another node.

FIG. 20 is a schematic diagram illustrating another example local-PD-detection system 2000, in accordance with techniques of this disclosure. Local-PD-detection system 2000 is an example of an external and retrofittable solution for local partial discharge detection, intentional signal communication, power harvesting, and other signal sensing at a single sensing node 2010 coupled to multiple cables 2050A-2050N. Sensing node 2010 is capacitively coupled to cable shields 104 (FIG. 1) via coupling layers 118 disposed directly over cable splices 1860, This example configuration provides the ability to extract native signals like PD, and also to inject intentional signals (e.g., communication signals) into cables 2050.

Power-line-monitoring system 2000 further includes a plurality of additional sensors 2020, which may include, as non-limiting examples, temperature sensors, current sensors (e.g., Rogowski coils), chemical sensors, high-frequency current transformers, or other similar sensors. As described above, because node 2010 is configured to operate on relatively low levels of power, node 2010 includes an optional energy-harvesting unit 2030 that is inductively coupled to one of cables 2050 that provides enough power to operate node 2010.

Figure 21:
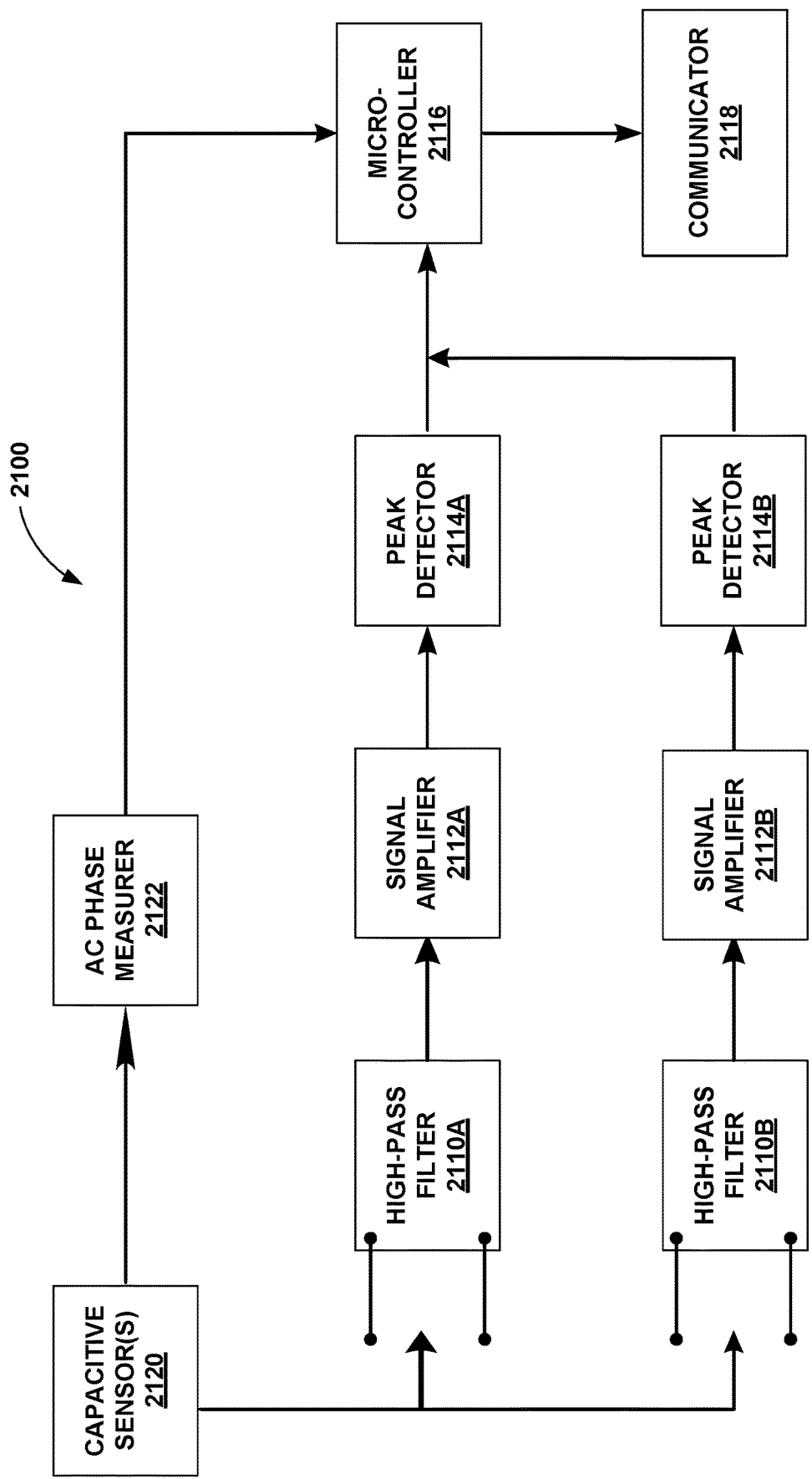
FIG. 21 is a block diagram illustrating example techniques for detecting partial discharge within an electric power line, in accordance with this disclosure.

FIG. 21 is a conceptual block diagram illustrating an example system 2100 for detecting and processing local partial discharge within an electric power line, in accordance with this disclosure. System 2100 includes one or more capacitive sensors 2120, one or more high-pass filters 2110A and 2110B, one or more signal amplifiers 2112A and 2112B, one or more peak detectors 2114A and 2114B, a microcontroller 2116, a communicator 2118, and in some examples, an alternating-current (AC) phase measurer 2122.

System 2100 includes one or more sensors 2120, which are examples of sensors 120 of FIG. 3. For instance, sensors 2120 may include a capacitive layer 118 capacitively coupled to a cable or cable accessory, such as a splice or termination. This capacitive coupling is configured to detect electrical signals within the cable, including both unintentional or "native" signals, such as partial discharge signals or other random noise, as well as intentional communication signals.

System 2100 further includes one or more high-pass filters 2110A, 2110B (collectively, "high-pass filters 2110") configured to reduce or remove lower-frequency electrical signals from the signals detected by sensors 2120. As described above, higher-frequency random noise and other native signals tend to attenuate over an increased distance from the source, leaving lower-frequency signal over-represented within the signal detected by sensors 2120. By additionally filtering out the lower-frequency noise, the remaining portions of the sensed signal are more likely to include high-frequency signals indicative of near-source (e.g., "local") partial discharge events. System 2100 may also include one or more signal amplifiers 2112A, 2112B configured to further distinguish the local PD signals from the remaining background noise.

In accordance with the techniques of this disclosure, system 2100 includes one or more peak-detector circuits 2114A and 2114B configured to isolate and extract the local PD signal, which may help to substantially reduce both required operating power levels and manufacturing costs, when compared to a high-speed digital sampler. The use of a peak-detector circuit 2114 is enabled by observing the higher-frequency portions of the spectrum of PD signals, and further aided by the differential coupling configuration of sensors 2120, if implemented.

System 2100 further includes a microcontroller 2116 or other processing circuitry configured to perform further analysis on identified local PD signals. In some examples, microcontroller 2116 is configured to aggregate and store, e.g., in a memory or other storage component, historical statistics indicative of a number or frequency of detected local PD events over time. In some such examples, microcontroller 2116 may be configured to perform alerting, such as when the frequency of detected local PD events exceeds a predetermined threshold, or when a magnitude (e.g., signal amplitude) of a detected local PD event exceeds a predetermined threshold.

System 2100 includes a communication device or module 2118 configured to output data, such as an indication of a detected PD event or the statistical data of historical detected PD events, and/or the generated alerts of above-threshold. PD events or other indication of a high likelihood of cable failure. In some examples, but not all examples, communication device 2118 includes sensors 2120, such as when sensors 2120 are configured to inject intentional communication signals for transmission along the cable. In other examples, communicator 2118 includes a wired or wireless connection configured to transmit data or alerts to a central computing device. In some examples, but not all examples, system 2100 further includes an optional module 2122 configured to measure the fundamental phase of the AC current within the power line, e.g., for comparison, by microcontroller 2116, to the phase of a detected local PD signal.

Figure 22:
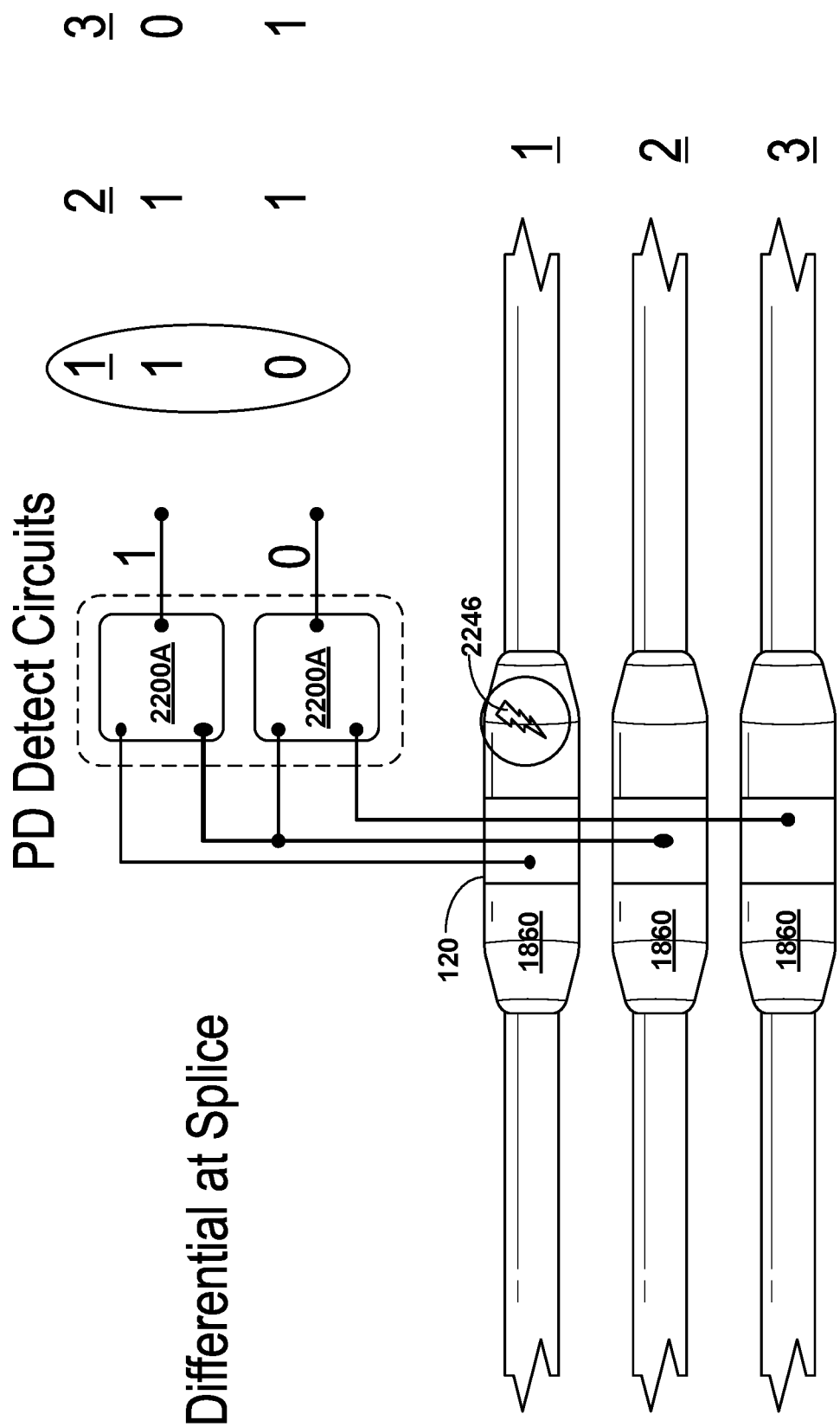
FIG. 22 is a conceptual diagram illustrating an example technique for monitoring for local partial discharge events within an electric power line, in accordance with this disclosure.

FIG. 22 is a conceptual diagram illustrating an example technique for monitoring for local partial discharge events within an electric power line, in accordance with this disclosure. Specifically, FIG. 22 depicts an example differential configuration for monitoring for local PD events within three cables of the power line (in particular, within cable splices 1860 of the cables), and then determining the particular cable associated with the PD source.

In general, for a power line having n number of monitored cables, then there are n–1 number of PD-detection circuits 2200 needed to determine the cable including the source of the PD. As described above, in some examples, a non-zero timing "window" can be defined and employed in order to account for offsets, variations, or discrepancies in PD-signal-detection times due to, for example, inherent uncertainty within detection circuits 2200, physical differences between detection circuits 2200. For example, a signal-detection occurring at slightly different times but within the same timing window may be considered to be the "same" signal detection at two circuits 2200. Conversely, if one circuit 2200A detects a signal within the timing window, but the other circuit 2200B does not, then the signal may be considered to have occurred at a sensor 120 that is coupled to circuit 2200A but not to circuit 2200B.

In the specific example of FIG. 22, if the top PD-detection it 2200A detects a local partial discharge signal 2246, but the bottom PD-detection circuit 2200B does not detect a partial discharge signal, then the signal may be concluded to originate from cable 1, because only circuit 2200A (and not circuit 2200B) is coupled to cable 1.

Similarly, if both circuits 2200A and 2200B detect a local partial discharge signal, then the signal may be concluded to originate from cable 2, because both circuits 2200A and 2200B are coupled to cable 2. Similarly, if the top PD-detection circuit 2200A does not detects a local partial discharge signal, but the bottom PD-detection circuit 2200B does detect a partial discharge signal, then the signal may be concluded to originate from cable 3, because only circuit 2200B (and not circuit 2200A) is coupled to cable 3.

Figure 23:
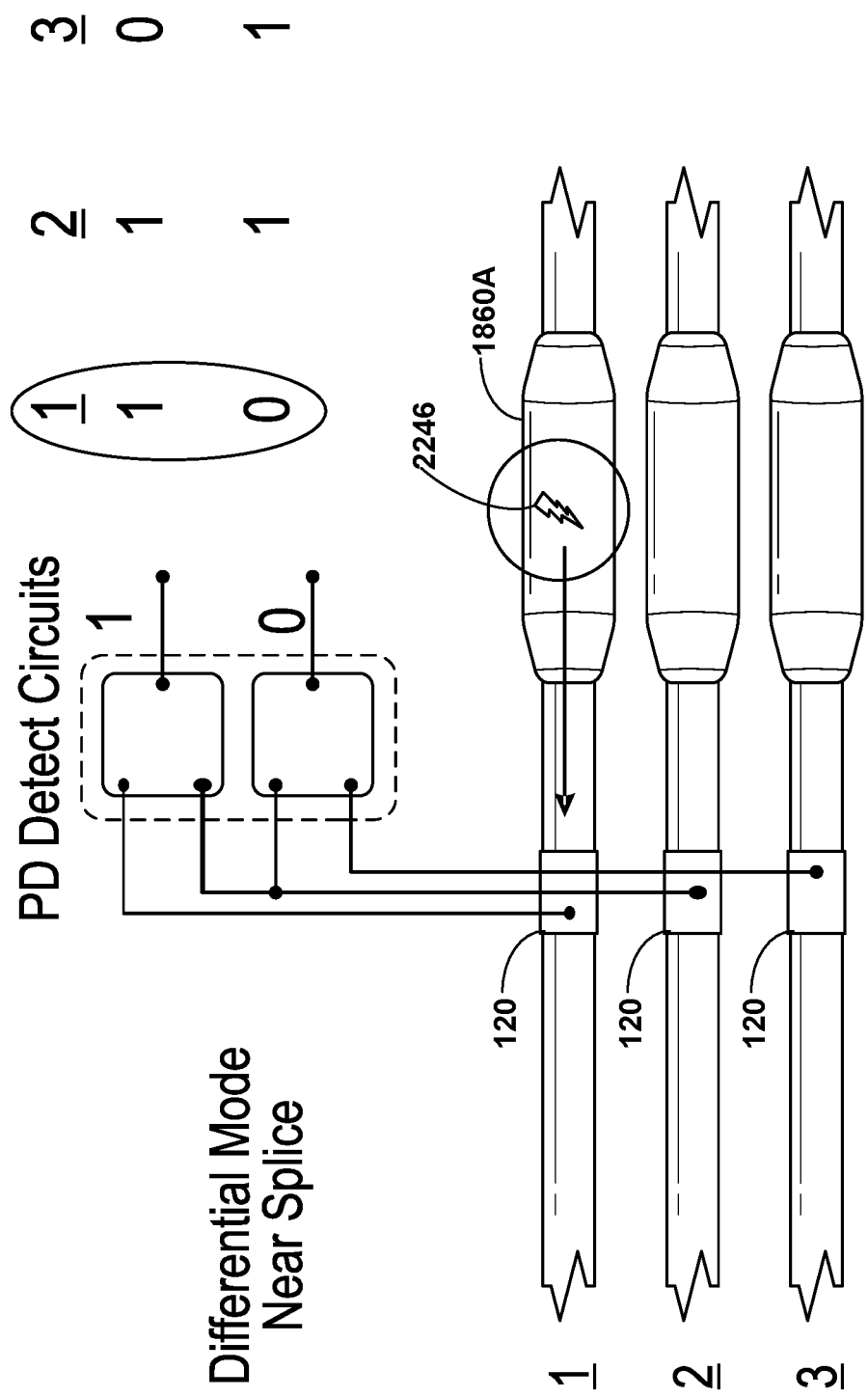
FIG. 23 is a conceptual diagram illustrating another example technique for monitoring for local partial discharge events within an electric power line, in accordance with this disclosure.

FIG. 23 depicts the same configuration as FIG. 22, except that in FIG. 23, the capacitive couplings 120 are not located directly on the cable splices 1860, but instead at locations on the cables some below-threshold distance away from splices 1860. However, the PD-signal detection can still be considered "local" since the higher-frequency components of the PD event originating from splice 1860A are detected and a high-pass filter 2110 (FIG. 21) is used to separate the ambient power-line noise.

Figure 24:
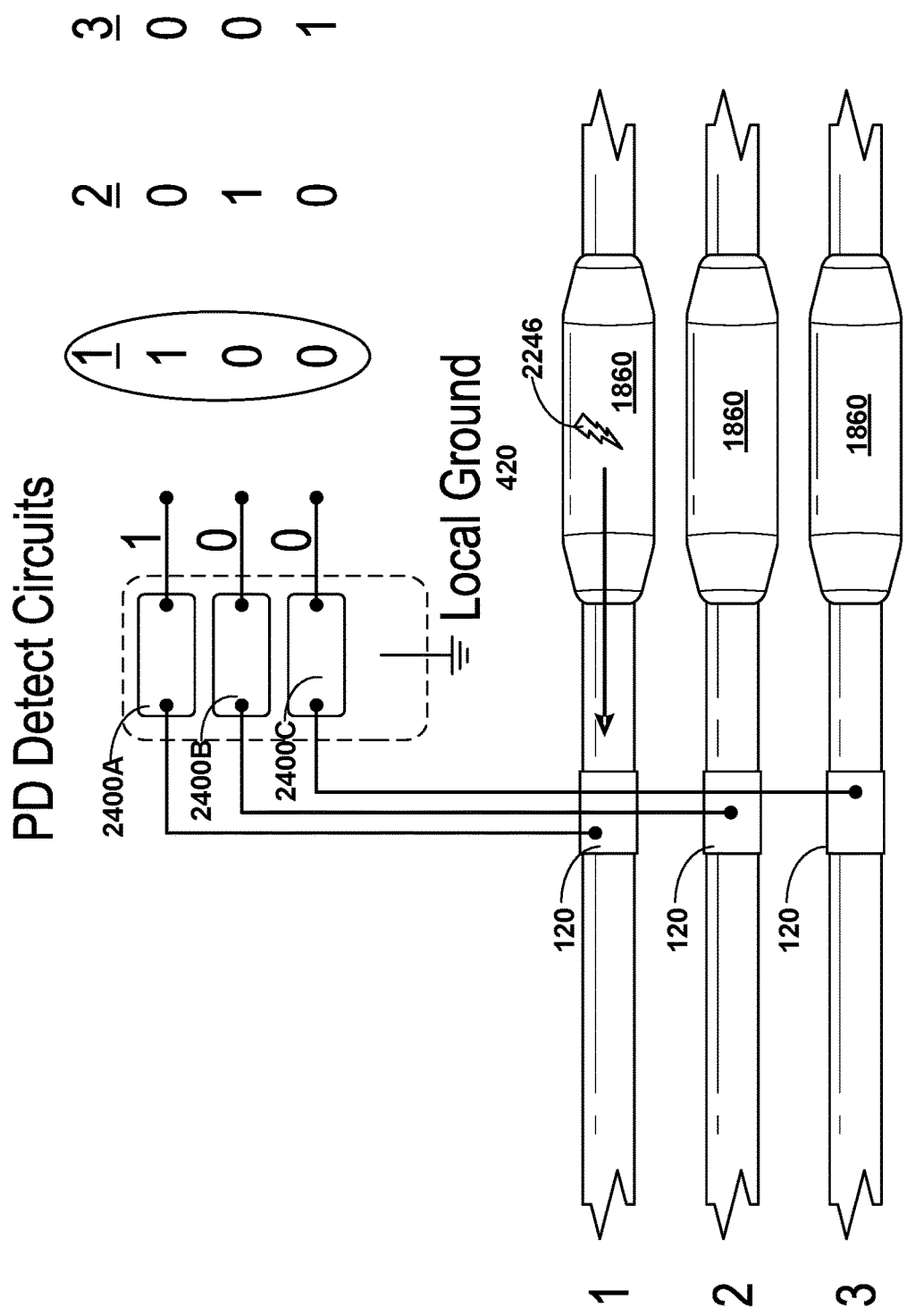
FIG. 24 is a conceptual diagram illustrating another technique for monitoring for a local partial discharge event within cables of an electric power line, in accordance with this disclosure.

FIG. 24 is a conceptual diagram illustrating another technique for monitoring for a local partial discharge event within cables of an electric power line, in accordance with this disclosure. More specifically, FIG. 24 depicts a single-ended configuration compared to the differential configurations of FIGS. 22 and 23), in which a local ground 420 is used as a reference for each capacitive coupler 120. In such examples, a single PD circuit 2400A-2400C can be employed on each cable, and the identification of the originating cable of the PD signal 2246 is unambiguous.

Figure 25:
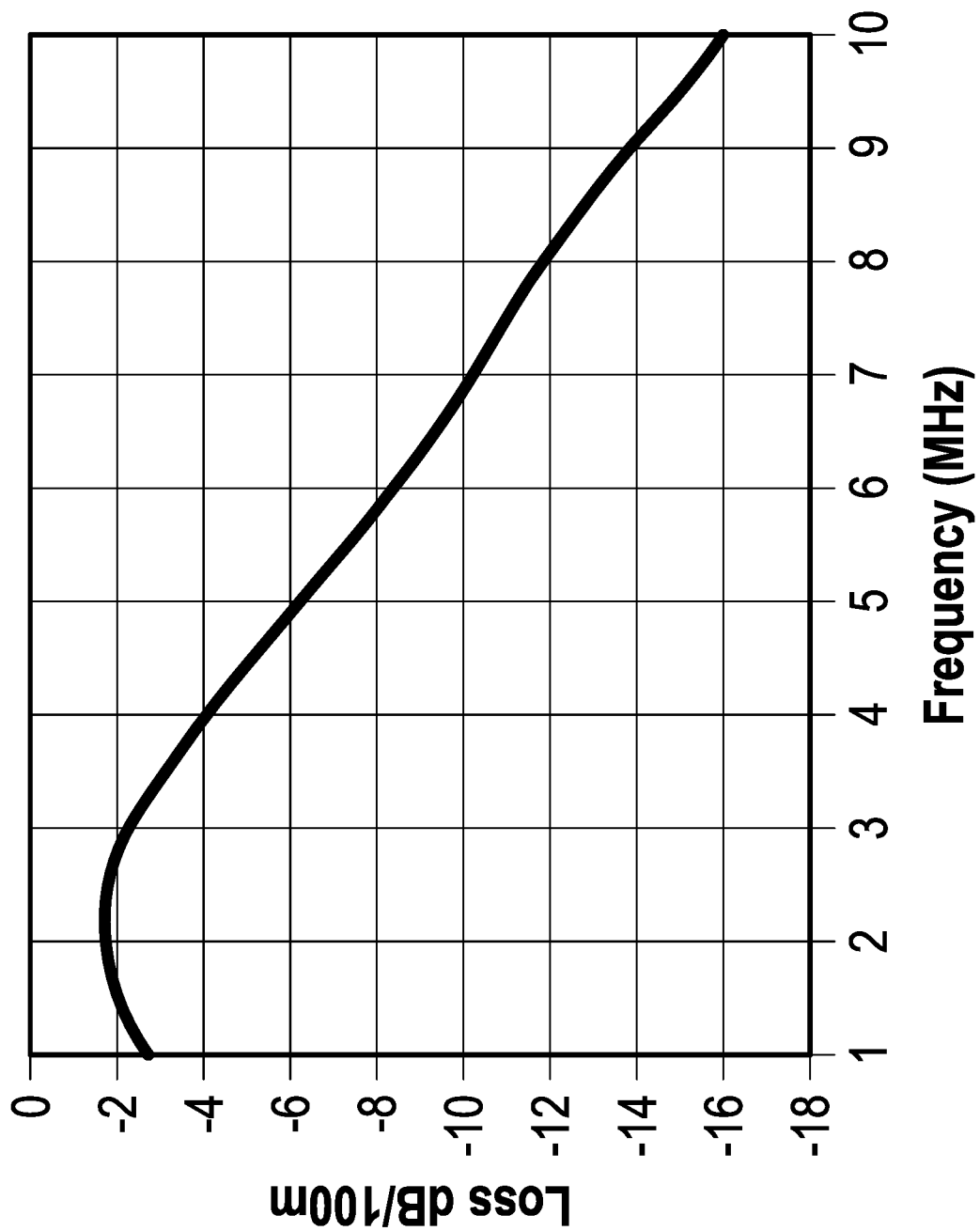
FIG. 25 is a line graph illustrating a characteristic power loss (e.g., signal attenuation over increased distance from the signal source) for different frequencies of electrical signals within an electric power line, in accordance with the techniques described herein.

FIG. 25 is a line graph illustrating the characteristic power loss (e.g., signal attenuation over increased distance from the signal source) for different frequencies of electrical signals within an electric power line, as may be observed at an example industrial site. As described above, a medium-voltage differential channel may be characterized with regard to its frequency-dependent attenuation properties.

As shown in FIG. 25, the power loss increases significantly as a function of frequency (and distance from the source), and therefore, the techniques of this disclosure include sensing and extracting higher-frequency components of a partial discharge signal at some distance relatively close to the source of the PD event. Additionally, because all forms of noise, including PD signals, typically exhibit the same characteristic frequency-based and distance-based attenuation, at long distances from the PD source, the PD signal must be extracted from a more-challenging noise background.

The graph shown in FIG. 25 supports the concept that higher-frequency signal content from partial discharge events tends to persist on within a cable (at least within relatively shorter distances) than lower-frequency signal content. By focus on these local, high-frequency signals, the techniques of this disclosure enable simple, low-cost localization of a PD event and can also provide a frequency range with less noise interference. It should be noted that PD signals can have a much wider range of frequency content than depicted in FIG. 25, however, the depicted range highlights the general trend of increased attenuation at higher frequencies.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an" and "the" encompass embodiments having plural referents, unless the content clearly dictates otherwise. As used in this specification and the appended claims, the term "or" is generally employed in its sense including "and/or" unless the content clearly dictates otherwise.

Spatially related terms including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change in RAM or cache).

Various examples have been described. These and other examples are within the scope of the following claims.

What is claimed is:

1. A system comprising:
a node comprising a first capacitive sensor configured to capacitively couple to a first shield layer of a first cable of a multi-phase electric power line, and further configured to collect, from the first cable, first sensor data indicative of a first alternating-current (AC) electrical signal in the first cable, and second capacitive senor configured to capacitively couple to a second shield layer of a second cable of the multi-phase electric power line, and further configured to collect, from the second cable, second sensor data indicative of a second AC electrical signal in the second cable, wherein the first capacitive sensor is configured to capacitively couple to the first shield layer of the first cable in a floating manner without being grounded and the second capacitive senor is configured to capacitively couple to the second shield layer of the second cable of the multi-phase electric power line in the floating manner without being grounded;

a first high-pass filter operatively coupled to the first capacitive sensor, and a second high-pass filter operatively coupled to the second capacitive sensor, wherein the first and second high pass filters are configured to filter out low-frequency signals from the first and second sensor data; and processing circuitry operatively coupled to the first and second high-pass filters and configured to detect, based on a differential signal of the first and second filtered sensor data, a partial discharge (PD) event at a location on the cable that is local to the node.

2. The system of claim 1, wherein the node comprises a detecting node, wherein the system further comprises a receiving node capacitively coupled to the first cable, and wherein the processing circuitry is further configured to cause the node to inject an identifier from the detecting node into the first cable in order to communicate, via the first cable, the location of the PD event to the receiving node.

3. The system of claim 2, wherein the processing circuitry is further configured to cause the node to inject a data signal into the first cable in order to communicate, via the cable, PD parameter data to the receiving node.

4. The system of claim 3, wherein the processing circuitry is further configured to determine, based on at least one PD event, the PD parameter data, wherein the PD parameter data comprises at least one of:
  a timing and an amplitude of the at least one PD event;
  a statistical representation of the at least one PD event over time;
  a phase relationship between the at least one PD event and the AC electrical signal; or
  an indication of a risk of cable failure associated with the at least one PD event.

5. The system of claim 3, wherein the processing circuitry is configured to communicate the PD parameter data on a continuous or semi-continuous basis.

6. The system of claim 1, wherein the first capacitive sensor is capacitively coupled to a continuous segment of the first cable.

7. The system of claim 1, wherein the first capacitive sensor is coupled to a cable splice connecting two adjacent segments of the first cable or to a termination of the cable.

8. The system of claim 1, wherein the node further comprises a power-harvesting device inductively coupled to the power line, wherein the power-harvesting device is configured to provide electrical energy to power the node.

9. The system of claim 1, wherein the processing circuitry is further configured to:
  determine, for each of a plurality of PD events at respective PD locations, a set of PD parameters including at least a risk of cable failure;
  determine, based on the set of PD parameters, a relative prioritization for each of the respective PD locations; and
  output, based on the relative prioritization, a ranked recommendation to inspect, repair, or replace a segment of the multi-phase power line at the respective PD locations associated with the first cable or the second cable.

10. The system of claim 1, wherein the processing circuitry is further configured to apply, to the sensor data, a machine-learning model configured to estimate a rate of damage progression in the first cable at the location on the first cable.

11. The system of claim 1, wherein the processing circuitry is further configured to:
  identify, based on the sensor data, an actual cable failure;
  store, in memory, the sensor data indicating the actual cable failure;
  generate, based on the sensor data, a predictive failure algorithm; and
  determine, based on the predictive failure algorithm and subsequent sensor data, PD locations that are progressing toward cable failure.

12. The system of claim 1,
  wherein the multi-phase power line comprises a plurality of cable pairs each comprising a respective first cable and a respective second cable.

13. The system of claim 12, wherein the processing circuitry is configured to determine which cable of the power line comprises the location of the PD event by:
  defining a timing window;
  identifying two differential nodes that detected the PD event within the timing window; and
  determining the location of the PD event by determining a common cable to which both of the two differential nodes are capacitively coupled.

14. The system of claim 1, further comprising one or more amplifiers configured to generate the differential signal.

15. The system of claim 14, wherein the one or more amplifiers comprise a current amplifier.

16. The system of claim 14, wherein the one or more amplifiers comprise a voltage amplifier.

* * * * *